(12) United States Patent
Baghel et al.

(10) Patent No.: US 11,051,339 B2
(45) Date of Patent: Jun. 29, 2021

(54) VEHICLE-TO-EVERYTHING ULTRA-RELIABLE/LOW-LATENCY COMMUNICATIONS DESIGN

(71) Applicant: QUALCOMM Incorporated, San Diego, CA (US)

(72) Inventors: Sudhir Kumar Baghel, Hillsborough, NJ (US); Junyi Li, Chester, NJ (US); Kapil Gulati, Dover, DE (US)

(73) Assignee: Qualcomm Incorporated, San Diego, CA (US)

( * ) Notice: Subject to any disclaimer, the term of this patent is extended or adjusted under 35 U.S.C. 154(b) by 76 days.

(21) Appl. No.: 16/267,051

(22) Filed: Feb. 4, 2019

(65) Prior Publication Data

US 2019/0246430 A1 Aug. 8, 2019

Related U.S. Application Data

(60) Provisional application No. 62/627,642, filed on Feb. 7, 2018.

(51) Int. Cl.
*H04W 74/08* (2009.01)
*H04W 72/04* (2009.01)
(Continued)

(52) U.S. Cl.
CPC ......... *H04W 74/0816* (2013.01); *H04W 4/40* (2018.02); *H04W 72/0446* (2013.01); *H04W 72/1263* (2013.01); *H04W 72/10* (2013.01)

(58) Field of Classification Search
CPC ......... H04W 74/0816; H04W 72/0446; H04W 72/1263; H04W 72/10; H04W 4/40
See application file for complete search history.

(56) References Cited

U.S. PATENT DOCUMENTS

2018/0139770 A1* 5/2018 Ozturk .................. H04L 5/0078
2018/0167848 A1   6/2018 Lei et al.
(Continued)

OTHER PUBLICATIONS

ZTE: "Consideration on Short TTI Based PC5 Operation," 3GPP Draft; R2-1708511, Mobile Competence Centre; 650 Route Des Lucioles; F-06921 Sofphia-Antipolis Cedex; vol. RANWG2, No. Berlin, Germany; Aug. 21, 2017-Aug. 25, 2017, Aug. 20, 2017, XP051318366, 5 Pages.*

(Continued)

*Primary Examiner* — Jamal Javaid
*Assistant Examiner* — Ryan C Kavleski
(74) *Attorney, Agent, or Firm* — Holland & Hart LLP

(57) ABSTRACT

Methods, systems, and devices for wireless communications are described. A UE may identify a plurality of shortened transmission time intervals (TTIs) to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The UE may perform a listen-before-talk procedure in order to reserve the plurality of shortened TTIs for the priority communications. The UE may further reserving at least one instance of the plurality of shortened TTIs for the priority communication. The further reserving may include transmitting a request to reserve the at least one instance of the plurality of shortened TTIs for the priority communication or performing a request-to-send/clear-to-send exchange.

26 Claims, 16 Drawing Sheets

(51) Int. Cl.
*H04W 72/12* (2009.01)
*H04W 4/40* (2018.01)
*H04W 72/10* (2009.01)

(56) References Cited

U.S. PATENT DOCUMENTS

2018/0176956 A1* 6/2018 Koutsimanis ..... H04W 74/0808
2019/0268939 A1* 8/2019 Yang .................. H04W 72/042
2020/0119853 A1* 4/2020 Hassan Hussein ... H04L 1/1874

OTHER PUBLICATIONS

ZTE: "Consideration on Short TTI Based PC5 Operation," 3GPP Draft; R2-1708511, Mobile Compentence Centre; 650 Route Des Lucioles; F-06921 Sofphia-Antipolis Cedex; vol. RANWG2, No. Berlin, Germany; Aug. 21, 2017-Aug. 25, 2017, Aug. 20, 2017, XP051318366, 5 Pages. (Year: 2017).*

International Search Report and Written Opinion—PCT/US2019/016628—ISA/EPO—dated Jul. 19, 2019.

"3 Generation Partnership Project; Technical Specification Group Radio Access Network; Evolved Universal Terrestrial Radio Access (E-UTRA); Physical Layer Procedures (Release 15)," 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 16, 2018, pp. 422-479, XP051392689, [retrieved on Jan. 16, 2018] section 14; pp. 422-447.

"5G Automotive Vision," 3GPP Draft; 5G_White_Paper_Automotive, 3rd Generation Partnership Project (3GPP), Mobile Competence Centre; 650, Route Des Lucioles; F-06921 Sophia-Antipolis Cedex; France, Dec. 7, 2015, XP051053269, pp. 1-67, Retrieved from the Internet: URL: http://www.3gpp.org/ftp/Meetings_3GPP_SYNC/RAN/LSin/ [retrieved on Dec. 7, 2015] section 4.1; pp. 39-42.

OPPO: "Resource Selection for sTTI in eV2x," 3GPP Draft; R2-1712181—Resource Selection for STTI IN EV2X, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, XP051371339, 3 pages, Retrieved from the Internet: URL: http://www.3gpp.org/ftp/tsg%5Fran/WG2%5FRL2/TSGR2%5F100/Docs/ [retrieved on Nov. 17, 2017] section 1; p. 1 section 2; pp. 1, 2.

Partial International Search Report—PCT/US2019/016628—ISA/EPO —dated Apr. 12, 2019.

ZTE: "Consideration on Short TTI Based PC5 Operation," 3GPP Draft; R2-1708511 Consideration on Short TTI Based PC5 Operation, 3rd Generation Partnership Project (3GPP), Mobile Competence Centre; 650, Route Des Lucioles; F-06921 Sophia-Antipolis Cedex; vol. RAN WG2, No. Berlin, Germany; Aug. 21, 2017-Aug. 25, 2017, Aug. 20, 2017, XP051318366, 5 pages, Retrieved from the Internet: URL: http://www.3gpp.org/ftp/Meetings_3GPP_SYNC/RAN2/Docs/ [retrieved on Aug. 20, 2017] section 1; p. 1 section 2; pp. 1-4.

* cited by examiner

VEHICLE-TO-EVERYTHING ULTRA-RELIABLE/LOW-LATENCY COMMUNICATIONS DESIGN

CROSS REFERENCES

The present Application for Patent claims the benefit of U.S. Provisional Patent Application No. 62/627,642 by BAGHEL, et al., entitled "VEHICLE-TO-EVERYTHING ULTRA-RELIABLE/LOW-LATENCY COMMUNICATIONS DESIGN," filed Feb. 7, 2018, assigned to the assignee hereof, and expressly incorporated by reference herein.

BACKGROUND

The following relates generally to wireless communication, and more specifically to vehicle-to-everything (V2X) ultra-reliable/low-latency communications (URLLC) design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communications systems may be configured to support high priority communications, such as vehicle-based communications, URLLC, and the like. Such wireless communication systems may also operate in a shared or unlicensed radio frequency spectrum band, e.g., on channel(s) where the wireless devices must contend for the channel before communications can be performed. However, priority communications may be associated with stringent latency and reliability requirements and may be utilized in a variety of scenarios, such as emergency management communications, vehicle-based communications, factory automation communications, and the like. Operating in a shared or unlicensed radio frequency spectrum band may present difficulties in meeting such stringent time/reliability requirements, such as when a device is unable to capture the medium during the contention period. Therefore, it may be beneficial to enable an efficient mechanism to reserve resources for priority communications more frequently and/or reliably.

SUMMARY

The described techniques relate to improved methods, systems, devices, or apparatuses that support V2X URLLC design. Generally, the described techniques provide for both short-term protection (e.g., at the shortened transmission time interval (TTI), TTI, slot, and/or transmission opportunity (TxOP) level) and long-term protection (e.g., for a set of shortened TTIs, slots, and/or TxOPs) of available resources for high priority communications, such as URLLC, V2X communications, and the like. Generally, the techniques are described with respect to vehicle-based communication, such as vehicle-to-vehicle (V2V) communications, V2X communications, and the like. However, the described techniques are not limited to vehicle-based communications and, instead, can be used for any communications involving high priority (or communication types having a higher priority than other communication types).

In some aspects, the described techniques provide for overlapping resources available for both normal (or low) priority traffic and for high priority traffic (e.g., URLLC traffic, vehicle-based traffic, and the like). The configuration for the overlapping resources may be preconfigured (e.g., by the network) or configured using some other mechanism such that the wireless devices communicating on the resources are aware of the overlapping resource configuration. In some examples, this may include a first set of time-frequency resources (e.g., TTIs or slots) that are available for normal traffic (e.g., traffic having a priority level lower than other traffic types). The TTIs (or slots) of the first set of time-frequency resources may be contention based resources. This may also include a second set of time-frequency resources (e.g., shortened TTIs or mini-slots) that overlap some or all of the time-frequency resources of the first set. The shortened TTIs (or mini-slots) of the second set of time-frequency resources may also be contention based resources.

In some aspects, short-term protection for the shortened TTIs (or mini-slots) may be provided using a request, such as for example a request-to-send/clear-to-send (RTS/CTS) exchange (although in some other examples no response such as a CTS may be required). For example, a transmitting device may identify or otherwise determine a shortened TTI (or mini-slot) to use for priority communications, such as vehicle-based communications, URLLC, and the like. The transmitting device may transmit an RTS message during a first portion (e.g., symbol) of the shortened TTI that includes or otherwise conveys an indication of an identifier and a configuration for the priority communications. Other wireless devices who wish to participate in the priority communications may receive the RTS message and respond by transmitting a CTS message. Thus, the transmitting device may receive one or more CTS messages from participating wireless devices. The CTS message may include or otherwise convey an indication of a sequence that is selected in a manner that associates the CTS message with RTS message. The RTS/CTS exchange may reserve the shortened TTI and the transmitting device and wireless devices responding with CTS messages may then participate in the priority communications during the shortened TTI using the reserved resources.

In some aspects, long-term protection for multiple shortened TTIs (or mini slots) may also be provided. For example, the transmitting device may identify a plurality or set of shortened TTIs (or mini-slots) to be used for the priority communications. The transmitting device may perform a listen-before-talk (LBT) procedure before the plurality of shortened TTIs occur in order to signal a reservation of those shortened TTIs. The LBT procedure may include the transmitting device transmitting (e.g., broadcasting) a message that includes or otherwise conveys an indication reserving the shortened TTIs for the priority communications. Other wireless devices that wish to participate in the priority communications may respond to the broadcast with an acknowledgment message, which serves to signal their desire to participate. Generally, the long-term protection may be used in conjunction with the short-term protection scheme such that an RTS/CTS exchange may occur during some or all of the shortened TTIs. The RTS/CTS exchange may further reserve each of the shortened TTIs. In some aspects, the long-term protection provides a mechanism where the transmitting device receives a higher priority for accessing the shortened TTIs than other devices wishing to reserve the shortened TTI using its own RTS/CTS exchange. Other wireless devices monitoring the LBT exchange may therefore know that the shortened TTIs are reserved. However, should the RTS/CTS exchange not occur (e.g., no RTS messages are communicated during the first symbol of one or more instances of the shortened TTIs), the other wireless devices may determine that the transmitting device is not using that shortened TTI and therefore contend for the channel.

A method of wireless communication is described. The method may include identifying a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, performing a LBT procedure in order to reserve the plurality of shortened TTIs for the priority communications, and further reserving at least one instance of the plurality of shortened TTIs for the priority communications.

An apparatus for wireless communication is described. The apparatus may include means for identifying a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, means for performing a LBT procedure in order to reserve the plurality of shortened TTIs for the priority communications, and means for further reserving at least one instance of the plurality of shortened TTIs for the priority communications.

Another apparatus for wireless communication is described. The apparatus may include a processor, memory in electronic communication with the processor, and instructions stored in the memory. The instructions may be operable to cause the processor to identify a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, perform a LBT procedure in order to reserve the plurality of shortened TTIs for the priority communications, and further reserve at least one instance of the plurality of shortened TTIs for the priority communications.

A non-transitory computer-readable medium for wireless communication is described. The non-transitory computer-readable medium may include instructions operable to cause a processor to identify a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, perform a LBT procedure in order to reserve the plurality of shortened TTIs for the priority communications, and further reserve at least one instance of the plurality of shortened TTIs for the priority communications.

Some examples of the method, apparatus, and non-transitory computer-readable medium described above for further reserving may further include processes, features, means, or instructions for transmitting a request to reserve the at least one instance of the plurality of shortened TTIs for the priority communication.

Some examples of the method, apparatus, and non-transitory computer-readable medium described above for performing the LBT procedure may further include processes, features, means, or instructions for performing the LBT procedure using the other TTIs having the second traffic priority level.

Some examples of the method, apparatus, and non-transitory computer-readable medium described above may further include processes, features, means, or instructions for receiving, during the LBT procedure, an acknowledgement (ACK) message from one or more UEs to participate in the priority communications. Some examples of the method, apparatus, and non-transitory computer-readable medium described above may further include processes, features, means, or instructions for performing the priority communications with the UEs from which ACK messages were received.

Some examples of the method, apparatus, and non-transitory computer-readable medium described above for performing the LBT procedure may further include processes, features, means, or instructions for identifying a resource tree that includes a plurality of nodes, each node of the resource tree associated with some or all of a set of available time-frequency resources that include the plurality of shortened TTIs. Some examples of the method, apparatus, and non-transitory computer-readable medium described above for performing the LBT procedure may further include processes, features, means, or instructions for selecting the node of the resource tree based at least in part on the plurality of shortened TTIs.

Some examples of the method, apparatus, and non-transitory computer-readable medium described above may further include processes, features, means, or instructions for configuring one or more of a scheduling assignment (SA) message, or a medium access control (MAC) control element (CE), or a radio resource control (RRC) message to provide an indication in the LBT procedure reserving the plurality of shortened TTIs.

Some examples of the method, apparatus, and non-transitory computer-readable medium described above for the further reserving may further include processes, features, means, or instructions for performing a request-to-send/clear-to-send (RTS/CTS) exchange.

Some examples of the method, apparatus, and non-transitory computer-readable medium described above may further include processes, features, means, or instructions for performing the RTS/CTS exchange for only a portion of the plurality of shortened TTIs, wherein shortened TTIs other than the portion are available for other communications having the second traffic priority level.

Some examples of the method, apparatus, and non-transitory computer-readable medium described above may further include processes, features, means, or instructions for performing the RTS/CTS exchange for only a portion of the plurality of shortened TTIs based at least in part on an absence of receiving a negative acknowledgment (NACK) in response to the priority communications Some examples of the method, apparatus, and non-transitory computer-readable medium described above may further include processes, features, means, or instructions for transmitting an RTS message during the at least one instance of the plurality of shortened TTIs, the RTS message indicating an identifier and a configuration for the priority communications. Some examples of the method, apparatus, and non-transitory computer-readable medium described above may further include processes, features, means, or instructions for receiving a CTS message from one or more wireless devices participating in the priority communications, the CTS message indicating a sequence associating the CTS message with the RTS message.

Some examples of the method, apparatus, and non-transitory computer-readable medium described above may further include processes, features, means, or instructions for determining that the priority communications include periodic traffic satisfying a threshold, wherein performing the LBT procedure is based at least in part on the periodic traffic satisfying the threshold.

A method of wireless communication is described. The method may include receiving, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, transmitting, during the LBT procedure, an acknowledgement (ACK) message responsive to the indication, and receiving, during at least one instance of the plurality of shortened TTIs, a request further reserving the at least one instance of the plurality of shortened TTIs for the priority communications An apparatus for wireless communication is described. The apparatus may include means for receiving, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, transmitting, during the LBT procedure, an acknowledgement (ACK) message responsive to the indication; and receiving, during at least one instance of the plurality of shortened TTIs, a request further reserving the at least one instance of the plurality of shortened TTIs for the priority communications.

Another apparatus for wireless communication is described. The apparatus may include a processor, memory in electronic communication with the processor, and instructions stored in the memory. The instructions may be operable to cause the processor to receive, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, transmit, during the LBT procedure, an acknowledgement (ACK) message responsive to the indication; and receive, during at least one instance of the plurality of shortened TTIs, a request further reserving the at least one instance of the plurality of shortened TTIs for the priority communications.

A non-transitory computer-readable medium for wireless communication is described. The non-transitory computer-readable medium may include instructions operable to cause a processor to receive, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, transmit, during the LBT procedure, an acknowledgement (ACK) message responsive to the indication; and receive, during at least one instance of the plurality of shortened TTIs, a request further reserving the at least one instance of the plurality of shortened TTIs for the priority communications.

Some examples of the method, apparatus, and non-transitory computer-readable medium described above for may further include processes, features, means, or instructions for receiving the indication on the other TTIs having the second traffic priority level.

Some examples of the method, apparatus, and non-transitory computer-readable medium described above may for receiving the indication reserving the plurality of shortened TTIs further include processes, features, means, or instructions for identifying a resource tree that includes a plurality of nodes, each node of the resource tree associated with some or all of a set of available time-frequency resources including the plurality of shortened TTIs. Some examples of the method, apparatus, and non-transitory computer-readable medium described above may for receiving the indication reserving the plurality of shortened TTIs further include processes, features, means, or instructions for selecting the node of the resource tree based at least in part on the plurality of shortened TTIs.

Some examples of the method, apparatus, and non-transitory computer-readable medium described above may further include processes, features, means, or instructions for decoding one or more of a scheduling assignment (SA) message, or a medium access control (MAC) control element (CE), or a radio resource control (RRC) message to identify the indication reserving the plurality of shortened TTIs.

Some examples of the method, apparatus, and non-transitory computer-readable medium described above may further include processes, features, means, or instructions for, wherein the request is a request-to-send (RTS), sending a clear-to-send (CTS) message in response to the RTS.

Some examples of the method, apparatus, and non-transitory computer-readable medium described above may further include processes, features, means, or instructions for receiving an RTS message during the at least one instance of the plurality of shortened TTIs, the RTS message indicating an identifier and a configuration for the priority communications. Some examples of the method, apparatus, and non-transitory computer-readable medium described above may further include processes, features, means, or instructions for transmitting a CTS message for participating in the priority communications, the CTS message indicating a sequence associating the CTS message with the RTS message.

A method of wireless communication is described. The method may include receiving, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, determining that a request-to-send (RTS) message is not transmitted during a first symbol in at least one of the shortened TTIs, and performing an LBT procedure on resources that overlap in time with the at least one shortened TTI to reserve a TTI that includes the overlapping resources and that is longer than the at least one shortened TTI for other communications having the second traffic priority.

An apparatus for wireless communication is described. The apparatus may include means for receiving, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, means for determining that a request-to-send (RTS) message is not transmitted during a first symbol in at least one of the shortened TTIs; and means for performing an LBT procedure on resources that overlap in time with the at least one shortened TTI to reserve a TTI that includes the overlapping resources and that is longer than the at least one shortened TTI for other communications having the second traffic priority.

Another apparatus for wireless communication is described. The apparatus may include a processor, memory in electronic communication with the processor, and instructions stored in the memory. The instructions may be operable to cause the processor to receive, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, determine that a request-to-send (RTS) message is not transmitted during a first symbol in at least one of the shortened TTIs; and perform an LBT procedure on resources that overlap in time with the at least one shortened TTI to reserve a TTI that includes the overlapping resources and that is longer than the at least one shortened TTI for other communications having the second traffic priority.

A non-transitory computer-readable medium for wireless communication is described. The non-transitory computer-readable medium may include instructions operable to cause a processor to receive, during a LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level, to determine that a request-to-send (RTS) message is not transmitted during a first symbol in at least one of the shortened TTIs; and perform an LBT procedure on resources that overlap in time with the at least one shortened TTI to reserve a TTI that includes the overlapping resources and that is longer than the at least one shortened TTI for other communications having the second traffic priority.

Some examples of the method, apparatus, and non-transitory computer-readable medium described above with regard to receiving the indication may further include processes, features, means, or instructions for determining, based at least in part on the indication, not to participate in the communications to or from the vehicle having the first traffic priority level. Some examples of the method, apparatus, and non-transitory computer-readable medium described above with regard to receiving the indication may further include processes, features, means, or instructions for refraining from transmitting an acknowledgement message during the LBT procedure.

Some examples of the method, apparatus, and non-transitory computer-readable medium described above with regard to receiving the indication may further include processes, features, means, or instructions for receiving the indication on the other TTIs having the second traffic priority level.

DETAILED DESCRIPTION

Figure 1:
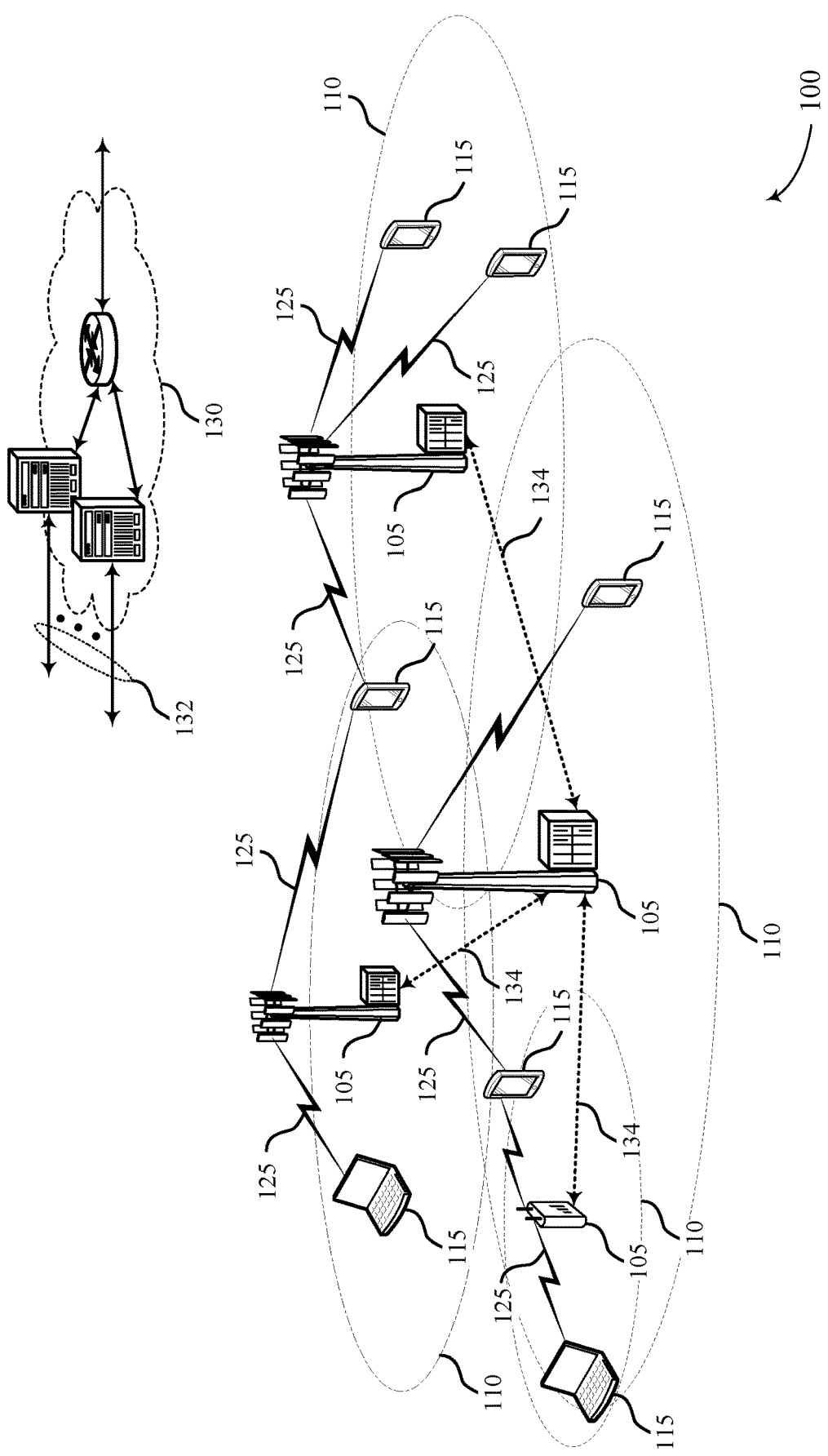
FIG. 1 illustrates an example of a system for wireless communication that supports V2X URLLC design in accordance with aspects of the present disclosure.

Some wireless communications systems may support communications in a shared or unlicensed radio frequency spectrum band. Such communications may include wireless devices contending for the channels before any communications may occur. Such contention procedures may include a clear channel assessment (CCA) procedure, a LBT procedure, and the like. Some wireless communications systems may also support communicating data having different priority levels. Examples of priority communications may include, but are not limited to, V2X communications, URLLC, mission critical (MiCr) communications, and the like. High priority communications are typically associated with low latency and/or higher reliability requirements. This may be problematic in a shared or unlicensed deployment where the wireless devices may not always be able to capture the medium.

Aspects of the disclosure are initially described in the context of a wireless communications system. In some aspects, the described techniques provide for overlapping resources that can be used for normal traffic and/or higher priority traffic. Some or all of the normal traffic resources may have overlapping resources that are configured for high priority traffic. The overlapping resource configuration may be preconfigured and/or determined based on some other mechanism. Generally, all wireless devices may be aware of the overlapping resource configuration such that they know when and where to access the medium and/or to monitor for others attempting to access the medium.

In some aspects, the described techniques provide for both short-term and long-term protection of the resources available for higher priority traffic. For example, short-term protection may include a transmitting device that may identify a shortened TTIs (or mini-slot) to use for priority communications. The priority communications may include vehicle-based communications, e.g., to and/or from a vehicle having a first traffic priority level. In some aspects, the shortened TTI may have a duration that is less than that of other TTIs that are used in normal communications, e.g., full TTIs used for communications having a second traffic priority level that is less than the first traffic priority level. To reserve one or more of the shortened TTIs, the transmitting device may transmit a request-to-send (RTS) message during the shortened TTI (e.g., during a first symbol of the shortened TTI). The RTS message may include or otherwise convey an indication of an identifier (e.g., an identifier are associated with a priority communications) and/or configuration information (e.g., an indication of whether the shortened TTI will be a control or a control-less shortened TTI).

Other wireless devices listening during the first symbol of the shortened TTI may receive the RTS message and determine whether they want to participate in the priority communications. If so, these devices may use the identifier and/or time-frequency resources of the RTS message to select a sequence. In some aspects, the sequence may associate a clear-to-send (CTS) message with the RTS message such that the transmitting device may know that the responding device wishes to participate in the priority communications during the shortened TTI. Accordingly, one or more responding devices may transmit CTS messages that includes or otherwise provides an indication of the sequence. The transmitting device and responding devices may then perform the priority communications during the shortened TTI based at least in part on the RTS/CTS exchange.

In some aspects, long-term protection may include the transmitting device identifying or otherwise selecting a plurality of shortened TTIs to be used for priority communications. In this case, and before the first instance of the shortened TTIs, the transmitting device may perform an LBT procedure in order to reserve the plurality of shortened TTIs for the priority communications. The LBT procedure may include the transmitting device broadcasting an indication that the plurality of shortened TTIs are reserved. Other wireless devices listening during the LBT procedure may receive the indication and decide that they want to participate in the priority communications. Accordingly, these participating devices may respond by transmitting an acknowledgment message to the transmitting device during the LBT procedure. This may provide an indication to all listening devices that the plurality of shortened TTIs are reserved for the transmitting device. However, the transmitting device and responding devices may also utilize the short-term protection scheme discussed above in order to further reserve each instance of the shortened TTI. For example, the devices may perform an RTS/CTS exchange during one or more of the instances of the plurality of shortened TTIs.

In some aspects, some of the reserved plurality of shortened TTIs may not be used, e.g., such as when they were reserved for a possible retransmission that does not need to occur. Accordingly, other wireless devices may listen during the first symbol of each instance of the shortened TTIs for the RTS/CTS exchange. When no exchange is observed, the other wireless devices may contend for the shortened TTI for priority communications using the short-term protection techniques discussed above.

Aspects of the disclosure are further illustrated by and described with reference to apparatus diagrams, system diagrams, and flowcharts that relate to V2X URLLC design.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some aspects, a UE 115 may identify shortened TTI to be used for priority communications to or from a vehicle having a first traffic priority level, the shortened TTI having a duration that is less than that of other TTIs used in other communications to or from the vehicle having a second traffic priority level which is less than the first traffic priority level. The UE 115 may transmit an RTS message during the shortened TTI, the RTS message indicating an identifier and a configuration for the priority communications during the shortened TTI. The UE 115 may receive a CTS message from one or more wireless devices participating in the priority communications, the CTS message indicating a sequence associating the CTS message with the RTS message. The UE 115 may perform the priority communications with the wireless devices from which the CTS messages were received.

In some aspects, a UE 115 may receive an RTS message from a wireless device during a shortened TTI reserved for use for priority communications to or from a vehicle having a first traffic priority level, the shortened TTI having a duration that is less than that of other TTIs used in other communications to or from the vehicle having a second traffic priority level which is less than the first traffic priority level, the RTS message indicating an identifier and a configuration for the priority communications during the shortened TTI. The UE 115 may identify a sequence based at least in part on the RTS message. The UE 115 may transmit a CTS message indicating the sequence and using a set of resource blocks (RBs) having a same number of RBs as is used for the RTS message, wherein the sequence associates the CTS message with the RTS message. The UE 115 may perform the priority communications with the wireless device from which the RTS message was received.

In some aspects, a UE 115 may identify a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The UE 115 may perform an LBT procedure in order to reserve the plurality of shortened TTIs for the priority communications. The UE 115 may perform, for at least one instance of the plurality of shortened TTIs, an RTS/CTS exchange to further reserve the at least one instance of the plurality of shortened TTIs for the priority communications.

In some aspects, a UE 115 may receive, during an LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The UE 115 may transmit, during the LBT procedure, an acknowledgement (ACK) message responsive to the indication. The UE 115 may perform, during at least one instance of the plurality of shortened TTIs, an RTS/CTS exchange to reserve the at least one instance of the plurality of shortened TTIs for the priority communications.

In some aspects, a UE 115 may receive, during an LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The UE 115 may determine that an RTS message is not transmitted during a first symbol in at least one of the shortened TTIs. The UE 115 may perform an LBT procedure on another TTI overlapping the at least one shortened TTI to reserve the other TTI for other communications having the second traffic priority.

Figure 2:
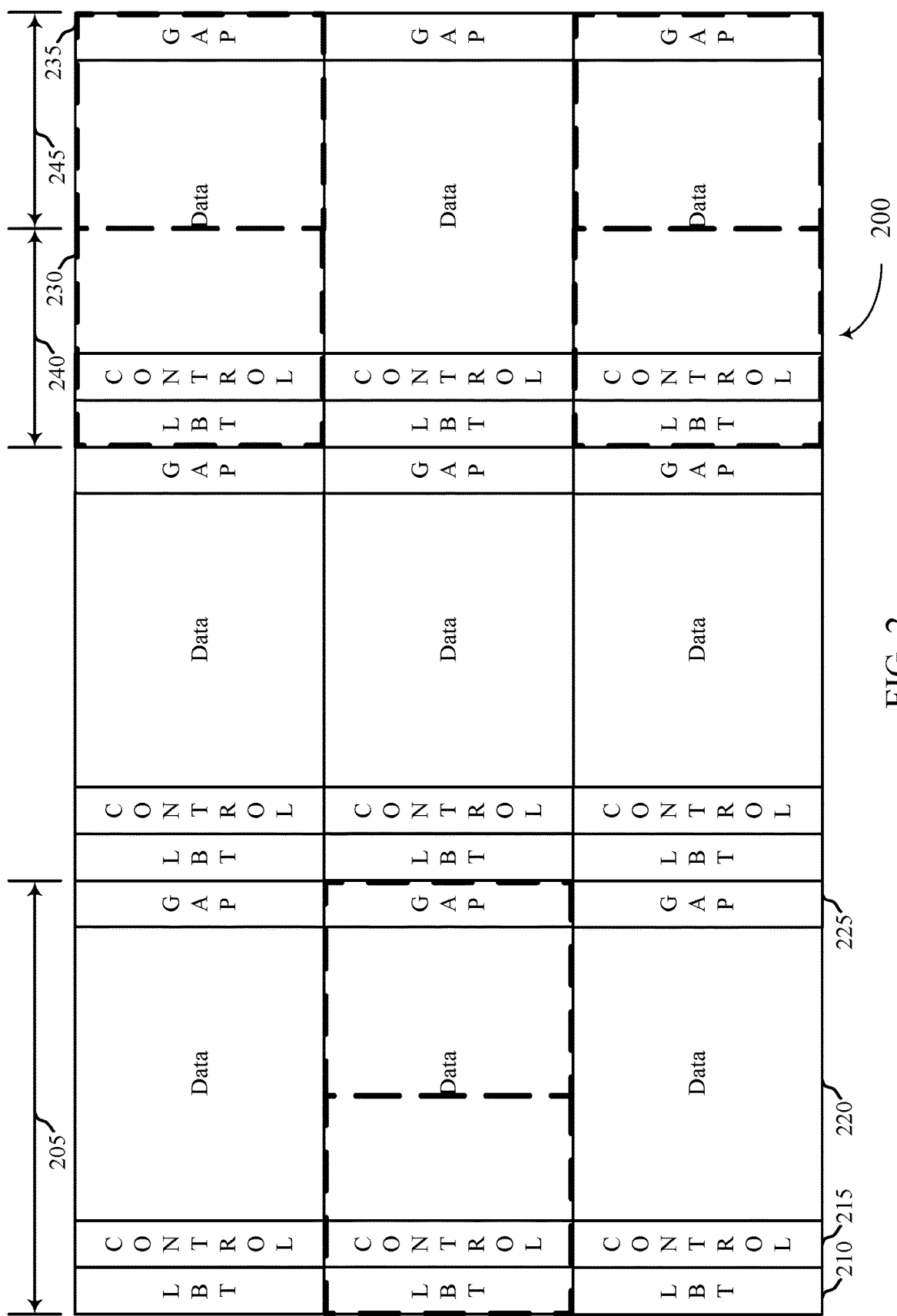
FIG. 2 illustrates an example of a resource configuration that supports V2X URLLC design in accordance with aspects of the present disclosure.

FIG. 2 illustrates an example of a resource configuration 200 that supports V2X URLLC design in accordance with various aspects of the present disclosure. In some examples, resource configuration 200 may implement aspects of wireless communication system 100. Aspects of resource configuration 200 may be implemented by a UE, which may be an example of the corresponding devices described herein. In some aspects, the UE may be considered a transmitting device in that the UE wishes to perform priority communications by reserving resources. In some aspects, the UE may be considered a participating device in that the UE may wish to participate in priority communications with the transmitting device. In some aspects, the UE may be considered a non-participating device in that the UE does not wish to participate in the priority communications.

Generally, resource configuration 200 illustrates a plurality of TTIs 205. In the example resource configuration 200, there are three TTIs 205 illustrated in the time domain and three TTIs 205 illustrated in the frequency domain, e.g., three TTIs 205 per channel and nine in total. Other numbers and/or arrangements of the TTIs 205 may be utilized. Each TTI 205 may include a period for performing an LBT 210, a period for control 215, a period for data 220, and a period for a gap 225 (with only one TTI 205 being labeled for ease of reference). In some aspects, each TTI 205 may be considered as a TTI used in normal priority communications. For example, any of the wireless devices operating on a network may contend for the medium during the LBT 210 and, if successful in capturing the medium, transmit control 215 followed by data 220. The period for the gap 225 may be used to transition from transmit to receive, e.g., in order to monitor for the LBT 210 and the subsequent TTI 205.

In some aspects, some or all of the TTIs 205 may have overlapping resources that are used for priority communications, e.g., communications to and/or from a vehicle having a first traffic priority level. In some aspects, the overlapping resources may include one or more shortened TTIs, such as shortened TTI 230 and 235 (illustrated by the dashed lines overlaying a portion of one TTI 205). Each shortened TTI may have an associated duration, such as such as duration 240 for shortened TTI 230 and duration 245 for shortened TTI 235. The duration of the shortened TTIs are less than that of the duration of the TTI 205. In one non-limiting example, each TTI 205 corresponds to a slot and each shortened TTI (e.g., shortened TTIs 230 and 235) corresponds to a mini slot. Other duration TTIs and/or shortened TTIs may also be utilized.

In some aspects, the configuration for the overlapping resources may be known by wireless devices participating in the priority and/or the non-priority communications. For example, the network and/or base station may broadcast information associated with the overlapping resource configuration. Accordingly, some or all of the wireless devices may know when to perform an LBT 210 in order to capture the medium for normal communications during a particular TTI 205. It is to be understood, that the configuration for the overlapping resources may be different from what is illustrated in resource configuration 200.

In some aspects, a UE may utilize resource configuration 200 in order to secure short-term and/or long-term reservation of some of the shortened TTIs (e.g., one or more of shortened TTI 230 and/or 235). Generally, the short-term protection may provide for reserving the shortened TTIs one at a time for priority communications, e.g. such as communications with a vehicle having first traffic priority level. The device reserving the shortened TTIs may be considered a transmitting device in that it may identify one or more of the shortened TTIs to be used for the priority communications. As is illustrated in resource configuration 200, the shortened TTI has a duration that is less than that of the other TTIs (e.g., any of the TTIs 205) that are used in other communications (e.g., communications with a vehicle having a second traffic priority level which is less than the first traffic priority level).

The transmitting device may transmit an RTS message during the shortened TTI that includes or otherwise provides an indication of an identifier and a configuration for the priority communications. In some aspects, the RTS message may be transmitted in a first symbol of the shortened TTI and may use the same number of resource blocks that will be used for the priority communications, e.g., for both control and data transmitted during the priority communications. In some aspects, the identifier may be a number that is uniquely associated with the priority communications. The configuration information of the RTS message may provide an indication of whether the RTS message is a control RTS message or a control-less RTS message. For example, the RTS message may include one or more bits or fields that are configured in order to provide the indication. In the control-less RTS message example, the RTS message may include a portion of control information that might otherwise be communicated in association with the priority communications. In some examples, the RTS message may be considered a soft RTS (sRTS) message in that it may contain a smaller set of information than a traditional RTS message, may use a low code rate, and the like. In some examples, the RTS message may be transmitted in the form of a repeated half symbol transmission, e.g., two instances of the RTS message may be transmitted during the first symbol of the shortened TTI.

Other wireless devices may receive the RTS message and determine whether they want to participate in the priority communications. For example, the other wireless devices may determine whether they have information that they want to share with and/or receive from the transmitting device. Those wireless devices that wish to participate in the priority communications may identify a sequence based, at least in some aspects, on the RTS message. For example, the sequence may be identified or otherwise selected based on the time and/or frequency resources used to transmit the RTS message. Additionally or alternatively, the sequence may be identified or otherwise selected based on the identifier included in the RTS message. Accordingly, the sequence may therefore be associated with and/or otherwise provide an indication that the participating devices are responding to that particular RTS message. The participating devices may respond to the RTS message by transmitting a CTS message that includes or otherwise provides an indication of the sequence. The CTS message may use the same number of resource blocks as is used for the RTS message. In some examples, the CTS message may be considered a soft CTS (sCTS) message in that it may contain a smaller set of information than a traditional CTS message, may use a low code rate, and the like. Accordingly, the transmitting device and the participating devices that have responded with CTS messages may perform the priority communications during the shortened TTI.

Generally, long-term protection may include the transmitting device reserving a plurality of the shortened TTIs (e.g., shortened TTIs 230 and 235). The transmitting device may reserve the plurality of shortened TTIs beforehand, e.g., prior to the occurrence of the first instance of the first shortened TTI in the plurality of shortened TTIs. In some aspects, the transmitting device may identify the plurality of shortened TTIs to be reserved for the priority communications and perform an LBT procedure beforehand to reserve those resources. During the LBT procedure, the transmitting device may transmit (e.g., broadcast) a signal or message that includes or otherwise conveys an indication that the transmitting device is reserving the plurality of shortened TTIs.

In some aspects, the transmitting device may perform a long-term reservation based on determining or otherwise identifying a particular traffic type. For example, the transmitting device may identify periodic traffic that includes multiple transmissions over a certain time frame and reserve the plurality of shortened TTIs for the periodic traffic.

Other wireless devices may receive the indication from the transmitting device during the LBT procedure and determine whether they want to participate in the priority communications. The wireless devices that wish to participate may respond by transmitting a signal, e.g., such as an acknowledgment message, to the transmitting device during the LBT procedure. Thus, the transmitting device may receive multiple acknowledgment messages from other wireless devices. Generally, the indication and acknowledgment messages exchanged during the LBT procedure serve as a signal to non-participating wireless devices that the plurality of shortened TTIs are reserved.

In some aspects, the long-term protection scheme may also include the RTS/CTS exchange described above in connection with the short-term protection scheme. Thus, during each instance of one or more of the plurality of reserved shortened TTIs the transmitting device may transmit an RTS message during the first symbol of the shortened TTI. The participating devices may respond to the RTS message with CTS messages, as is described above. Accordingly, the RTS/CTS exchange may further reserve each instance of the shortened TTIs that are used for the priority communications.

In some aspects, one or more instances of the shortened TTIs that are reserved according to the long-term protection scheme may not be used. For example, the transmitting device may reserve a sufficient amount of shortened TTIs to cover transmission and retransmission of information during the priority communications. However, the retransmission may not be necessary, e.g., such as when the transmission is successful. Accordingly, other wireless devices (e.g., non-participating and/or participating wireless devices) may monitor for the RTS message during the first symbol of a shortened TTI and, when no RTS message is detected, may transmit an RTS message in order to reserve that shortened TTI for priority communications and/or may begin an LBT procedure in order to reserve the TTI 205 for non-priority communications.

Figure 3:
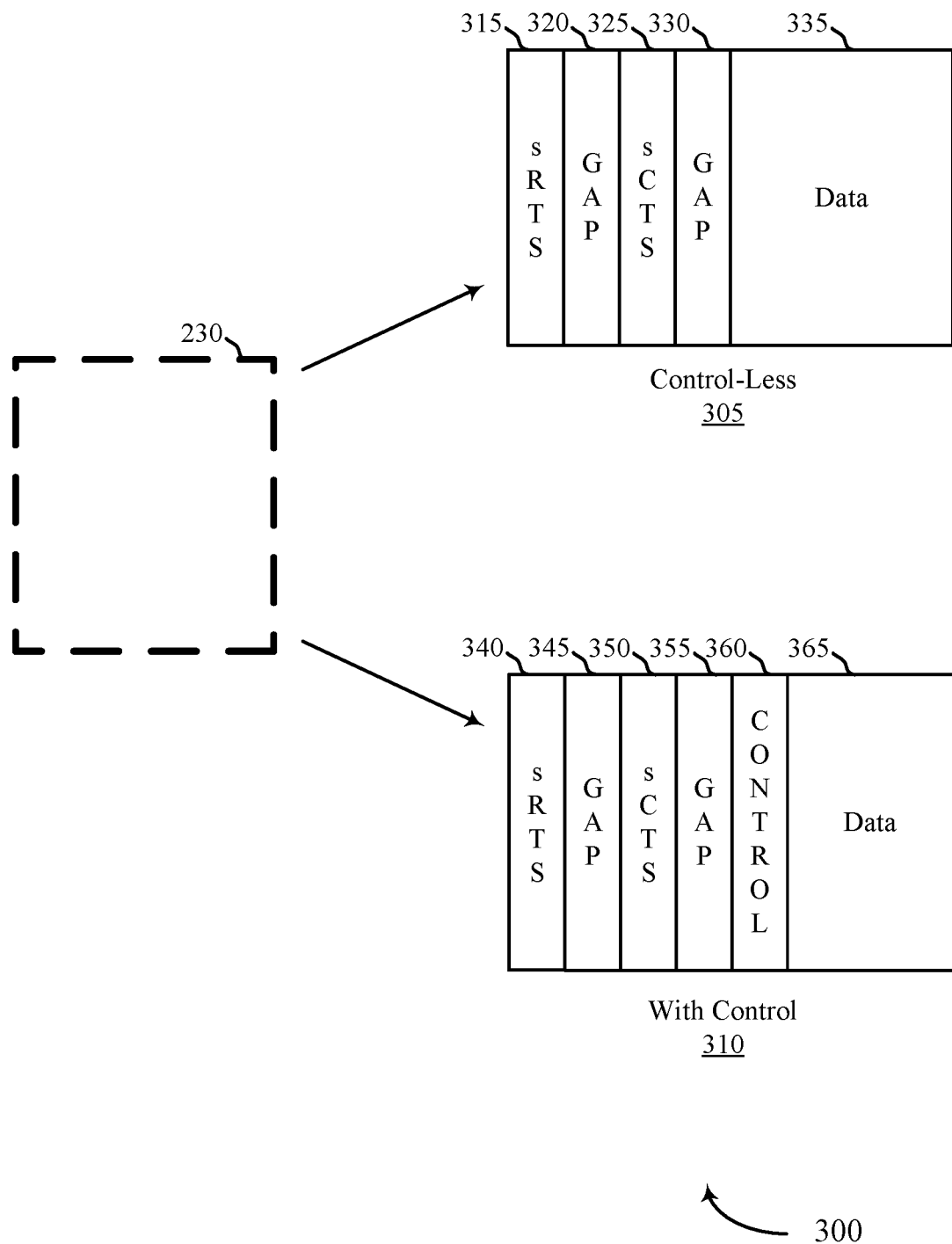
FIG. 3 illustrates an example of a resource configuration that supports V2X URLLC design in accordance with aspects of the present disclosure.

FIG. 3 illustrates an example of a resource configuration 300 that supports V2X URLLC design in accordance with various aspects of the present disclosure. In some examples, resource configuration 300 may implement aspects of wireless communication system 100 and/or resource configuration 200. Aspects of resource configuration 300 may be implemented by a UE, which may be an example of the corresponding devices described herein. In some aspects, the UE may be considered a transmitting device, a participating device, and/or a non-participating device.

Generally, resource configuration 300 illustrates two examples of a shortened TTI, such as shortened TTI 230 of FIG. 2. In particular, resource configuration 300 illustrates a control-less shortened TTI 305 and a control shortened TTI 310. Generally, the control-less shortened TTI 305 illustrates an example where some or all of the control information for the priority communication may be included or otherwise conveyed in the RTS message.

Control-less shortened TTI 305 may include an sRTS message 315, a gap 320, an sCTS message 325, a gap 330, and a data 335. Control shortened TTI 310 may include an sRTS message 340, a gap 345, an sCTS message 350, a gap 355, a control 360, and a data 365.

The sRTS message 315/340 may be transmitted by a devise reserving the shortened TTI. In some aspects, sRTS message 315/340 may provide an indication of an intention of transmission by the transmitting device, e.g., to perform the priority communications. The sRTS message 315/340 may include a few information bits, may use a low code rate, may have an associated demodulation reference signal (DMRS), and the like. The sRTS message 315/340 may follow a sub-channel approach and may have a fixed length in frequency, e.g., to reduce blind decoding complexity. Information bits in the sRTS message 315/340 may convey some form of identifier, such as destination identifiers, group identifier, or a unique identifier.

In some aspects, sRTS message 315/340 may have configuration information, e.g., may have one bit indicating whether the shortened TTI is a control-less shortened TTI 305 or a control shortened TTI 310. In the example where the shortened TTI is a control-less design, the configuration information in the sRTS message 315 may serve the purpose of control and resource reservation, e.g., may provide an indication of a modulation and coding scheme (MCS) for the priority communication.

In some aspects, the sRTS message 315/340 may perform aspects of power management for the priority communications. For example, to handle automatic gain control (AGC) setting, sRTS message 315/3440 may be transmitted in the form of repeated half symbol, e.g., two instances of the sRTS message 315/340 may be transmitted during the first symbol of the shortened TTI. In some aspects, sRTS messages 315/340 may be transmitted at a known power level (e.g., either fixed or configured system wide) so that participating devices can determine the pathloss.

In some aspects, the gaps 320, 330, 345, and/or 355 may provide a period where the wireless devices may transition from receive to transmit modes, or vice versa.

In some aspects, the sCTS message 325/350 may be transmitted by devices that wish to participate in the priority communications. sCTS 325/350 may be transmitted by participating devices that are within range of the transmitting device, e.g., receivers which are interested in URLLC transmission from the transmitter, where the transmitter is identified by the identifier in sRTS message 315/340. In some aspects, sCTS message 325/350 may be a sequence for SFN effect. The sequence may be derived based on the identifier in sRTS message 315/340 and/or based on the time and/or frequency resource of sRTS message 315/340. In some aspects, the sequences may be selected from a set of available sequences.

In some aspects, sCTS message 325/350 transmission power may be based on the received power of sRTS message 315/340 (e.g. to compensate for the pathloss). This may support only adequate protection zone or area being established.

In the example of the control shortened TTI 310, the control 360 may provide various control information for the priority transmission, e.g., MCS, and the like. The transmitting and participating wireless devices may perform the priority communications using the data 335/365.

In some examples, there may be multiple responses using the sCTS message 325/350. Generally, sCTS message 325/350 are transmitted in such a way that near-far effect can be avoided and all the responses from different devices are received at the same power level by the transmitting device that transmitted sRTS messages 315/340. However, if there were multiple transmitting devices, each transmitting separate sRTS messages 315/340 at the same time, then contention can be resolved by observing the response in sCTS message 325/350. For example, if device A finds its sequence in a sCTS with Power_Level_A and also detects an sCTS with a different sequence with Power_Level_B, then the decision to transmit control and data can be taken by following a certain logic. In one example of the logic, if the power for the device's own sequence is greater than that of the other sequences, or if the power of the device's own sequence is greater than a certain threshold of total energy, then the device may transmit the control and data in the shortened TTI. Otherwise the device may defer to a subsequent transmissions of control and data to the next shortened TTI opportunity.

Figure 4:
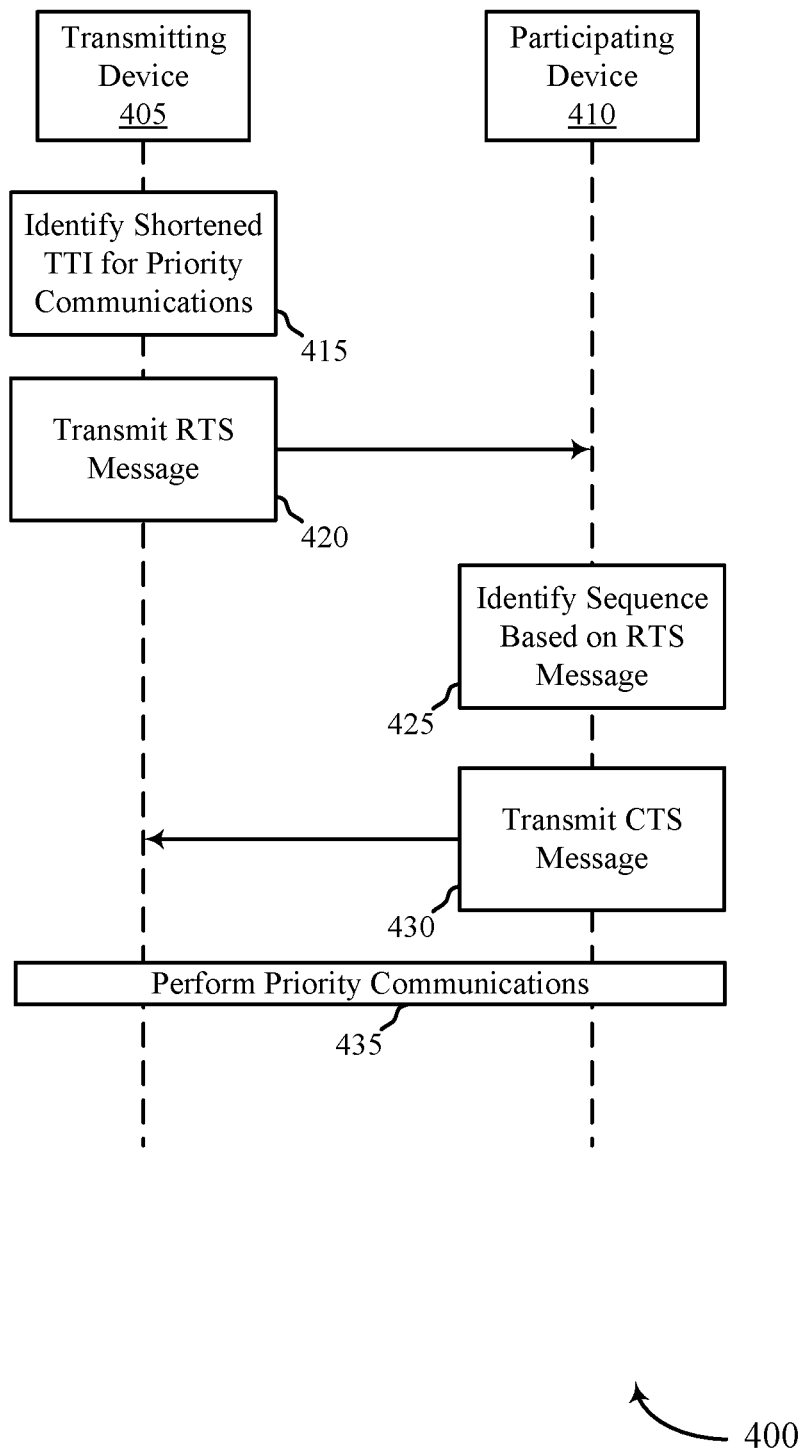
FIG. 4 illustrates an example of a process that supports V2X URLLC design in accordance with aspects of the present disclosure.

FIG. 4 illustrates an example of a process 400 that supports V2X URLLC design in accordance with various aspects of the present disclosure. In some examples, process 400 may implement aspects of wireless communication system 100 and/or resource configurations 200/300. Process 400 may include a transmitting device 405 and a participating the device 410, which may be examples of the corresponding devices described herein. In some aspects, transmitting device 405 and/or participating device 410 may be examples of a UE.

At 415, transmitting device 405 may identify shortened TTI to be used for priority communications. The priority communications may include communications with a vehicle having a first traffic priority level. The shortened TTI may have a duration that is less than that of other TTIs used in other communications, e.g., such as communications with a vehicle having a second traffic priority level that is less than the first traffic priority level.

At 420, transmitting device 405 may transmit (and receiving device 410 may receive) an RTS message during the shortened TTI. The RTS message may include or otherwise convey an indication of an identifier and/or a configuration for the priority communications during the shortened TTI. In some aspects, the RTS message may be transmitted in a first symbol set of the shortened TTI and using the same number of resource blocks that will be used for control and data transmissions during the priority communications.

In some aspects, transmitting device 405 may configure the RTS message to provide an indication of control information for the priority communications, e.g. an indication of whether the RTS as a control RTS or a control-less RTS. In some aspects, the RTS message may be transmitted as a half symbol, e.g., two instances of the RTS message may be transmitted during the first symbol. In some aspects, the RTS message may be a sRTS message.

At 425, participating device 410 may identify a sequence based at least in part on the RTS message. In some examples, participating device 410 may determine the sequence based on time and/or frequency resources of the shortened TTI on which the RTS message was received. In some examples, participating device 410 may determine the sequence based on the identifier included or otherwise conveyed in the RTS message.

At 430, participating device 410 may transmit (and transmitting device 405 may receive) a CTS message. It is to be understood that transmitting device 405 may receive multiple CTS messages, e.g., such as when more than one device wishes to participate in the priority communications. The CTS message may include or otherwise provide an indication of the sequence associating the CTS message with the RTS message. In some aspects, the CTS message is a sCTS message.

In some aspects, transmitting device 405 may receive other CTS messages that include sequences that are not otherwise associated with the RTS message. In this case, transmitting device 405 may determine whether to perform the priority communications with the participating device 410 based at least in part on the other CTS messages, e.g., based on the power levels for the CTS message received from participating devices and/or CTS messages received from non-participating devices. For example, transmitting device 405 may determine that the CTS message received from participating device 410 is received at a defined power level of the total energy detected or at a power level greater than a power level at which the other CTS messages are received and perform the priority communications based on this determination. In some aspects, transmitting device 405 may transmit a control message after receiving the CTS message and prior to performing the priority communications.

At 435, the transmitting device 405 and the receiving device 410 may participate or otherwise perform the priority communications.

Figure 5:
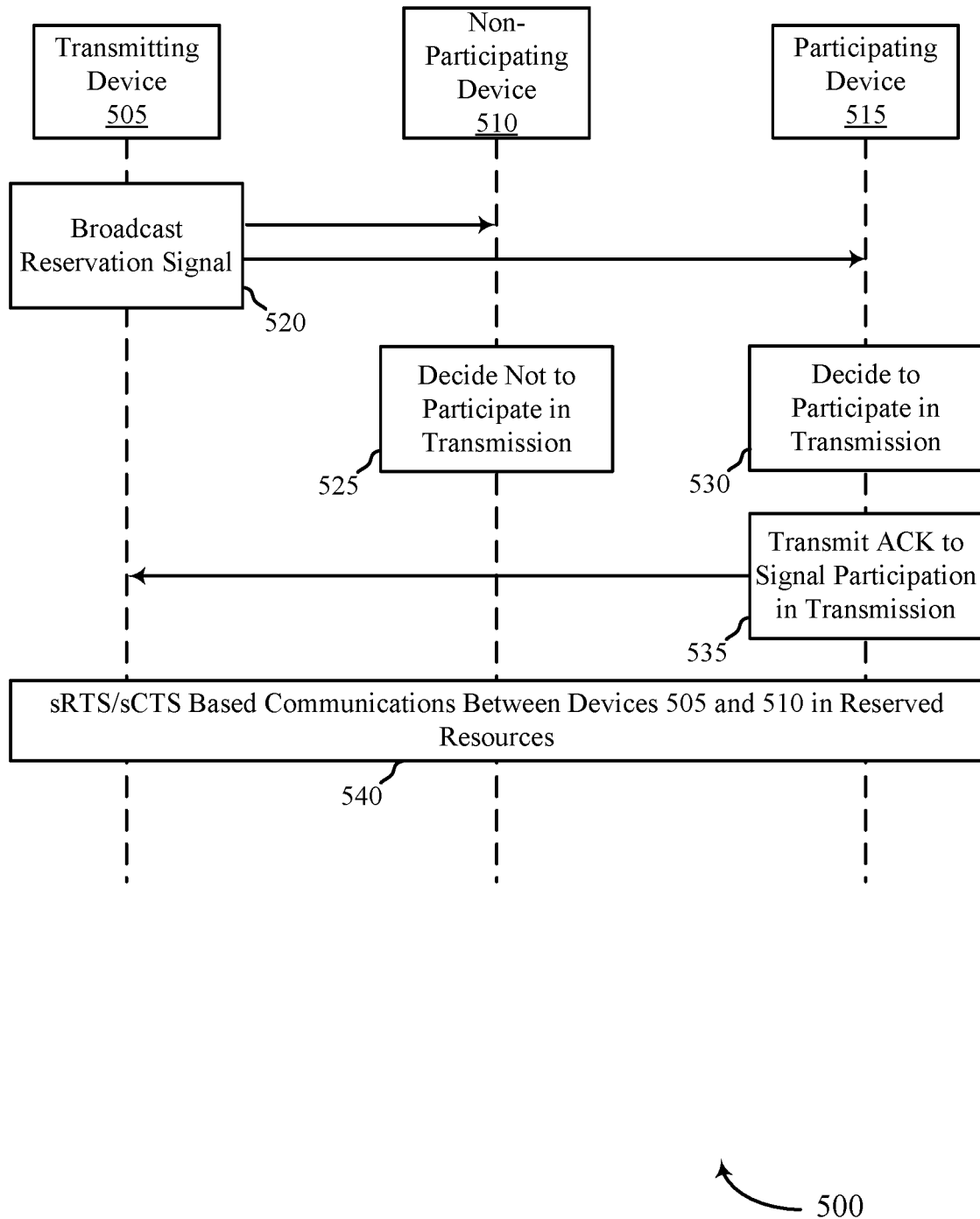
FIG. 5 illustrates an example of a process that supports V2X URLLC design in accordance with aspects of the present disclosure.

FIG. 5 illustrates an example of a process 500 that supports V2X URLLC design in accordance with various aspects of the present disclosure. In some examples, process 500 may implement aspects of wireless communication system 100, resource configurations 200/300, and/or process 400. Process 500 may include a transmitting device 505, a non-participating device 510, and a participating the device 515, which may be examples of the corresponding devices described herein. In some aspects, transmitting device 505, non-participating device 510, and/or participating device 515 may be examples of a UE.

Generally, process 500 illustrates an example of long-term protection of a plurality of shortened TTIs to be used for priority communications. For example, transmitting device 505 may determine that it has periodic traffic to communicate (e.g., traffic that cannot be communicated in a single shortened TTI, traffic that is repeated according to a periodic schedule, etc.). Accordingly, transmitting device 505 may decide to reserve the plurality of shortened TTIs utilizing process 500. Reserving the plurality of shortened TTIs may include long-term reservation during an LBT procedure and then further reservation during each instance of the shortened TTI using the RTS/CTS message exchange discussed above.

Transmitting device 505 may identify the plurality of shortened TTIs to be used for priority communications. The priority communications may include communications with the vehicle having a first traffic priority level. The plurality of shortened TTIs may each have a duration that is less than that of other TTIs used for other communications, e.g. such as communications with vehicles having a second traffic priority level that is less than the first traffic priority level. Transmitting device 505 may begin an LBT procedure in order to accomplish the long-term reservation of the plurality of shortened TTIs. Generally, steps 520, 525, 530, and 535, may be performed during the LBT procedure, such as during a contention period.

At 520, transmitting device 505 may transmit (and non-participating device 510 and participating device 515 may receive) a reservation signal. The reservation signal may include or otherwise convey an indication that the transmitting device 505 is reserving the plurality of shortened TTIs. For example, reservation signal may include bits, fields, and the like, which indicates that the transmitting device 505 is reserving shortened TTIs, identifies the shortened TTIs being reserved, and the like. Generally, the reservation signal may be broadcast in a manner such that it is received by non-participating device 510 and participating device 515.

In some aspects, resources for priority communications may be assigned to one or more nodes. For example, a tree structure may be used wherein the top node of the tree is associated with all available shortened TTIs, the second level nodes may be associated with the subset of the available shortened TTIs, and so on. Accordingly, in some examples the reservation signal may include or otherwise convey an indication of the node of the tree structure to signal which plurality of shortened TTIs are being reserved by transmitting device 505. Devices wishing to participate in the priority communications may receive the reservation signal and identify which node is being indicated. Accordingly, the devices wishing to participate in the priority communications may be able to determine which shortened TTIs are included in the plurality of shortened TTIs.

In some aspects, the indication communicated during the LBT procedure reserving the plurality shortened TTIs may be provided in a scheduling assignment message, in a MAC control element (CE), in an RRC message, and the like.

At 525, non-participating device 510, after receiving the reservation signal, may determine that it does not want to participate in the priority communications. Accordingly, no further action may be taken by non-participating device 510.

At 530, participating device 515 may determine that it does want to participate in the priority communication. For example, participating device 515 may determine that it wants to receive information from transmitting device 505 and/or that it has information to communicate to transmitting device 505. Accordingly and at 535, participating device 515 may transmit (and transmitting device 505 may receive) an acknowledgment signal that indicates that participating device 515 wants to participate in the priority communications. In some examples, the reservation signal may include an identifier associated with the priority communication session and the acknowledgment message may include or otherwise convey an indication of the identifier. In some examples, participating device 515 may select a sequence for the acknowledgment message based at least in part on the identifier indicated in the reservation signal, on time and/or frequency resources used for transmitting reservation signal, and the like.

Once transmitting device 505 receives all of the acknowledgment messages from wireless devices wishing to participate in the priority communications, transmitting device 505 and the participating devices (such as participating device 515) may perform further reservation of one or more of the shortened TTIs reserved during the LBT procedure. In some aspects, the further reservation may include the short-term protection techniques described above that include an RTS/CTS exchange. That is, at 540, during the first symbol of one or more of the shortened TTIs, transmitting device 505 may transmit an RTS message and participating devices (such as participating device 515) may respond by transmitting CTS messages.

In some aspects, one or more of the shortened TTIs reserved during the long-term protection scheme may not be used. In this instance, other devices may monitor the first symbol of an unused shortened TTI and determine that no RTS message has been transmitted. Accordingly, the other devices may begin an LBT procedure to utilize the resource for nonpriority communications.

Figure 6:
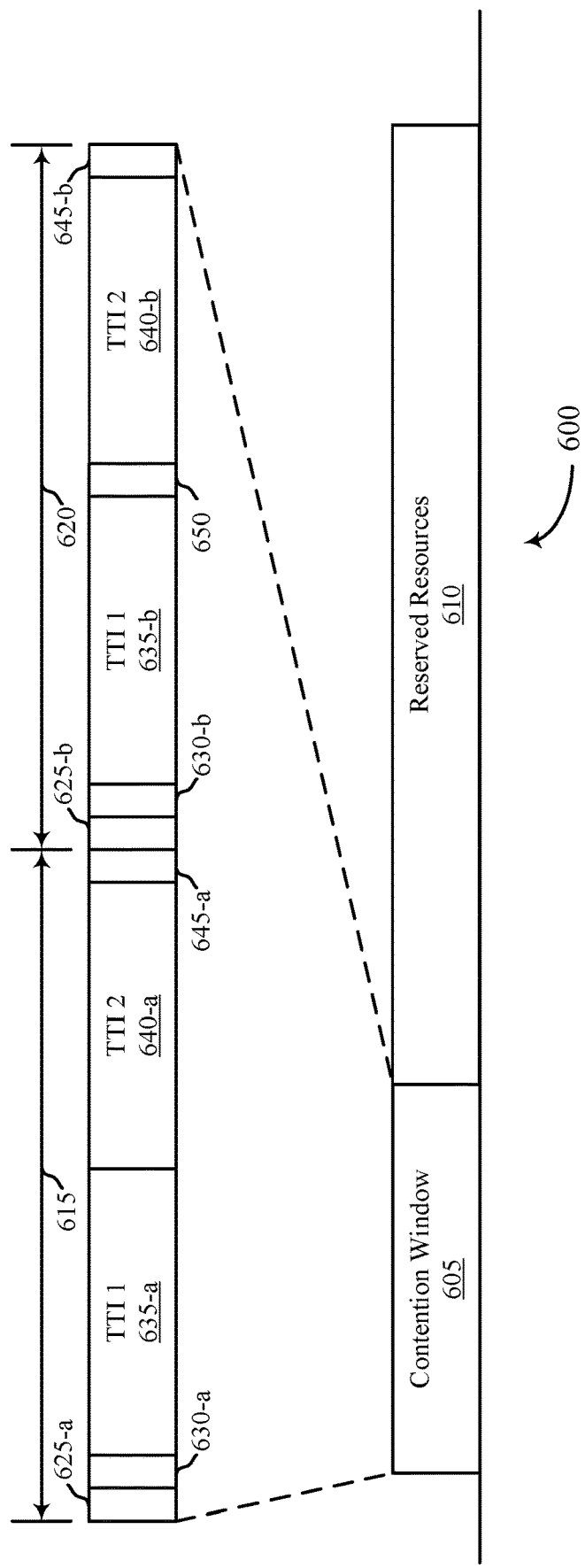
FIG. 6 illustrates an example of a resource configuration that supports V2X URLLC design in accordance with aspects of the present disclosure.

FIG. 6 illustrates an example of a resource configuration 600 that supports V2X URLLC design in accordance with various aspects of the present disclosure. In some examples, resource configuration 600 may implement aspects of wireless communication system 100, resource configurations 200/300, and/or processes 400/500. Aspects of resource configuration 600 may be implemented by a UE, transmitting device, a participating device, and/or non-participating device, which may be examples of the corresponding devices described herein.

Generally, resource configuration 600 may include a contention window 605 and reserved resources 610. The contention window 605 may correspond to an LBT procedure that is used for long-term reservation of a plurality of shortened TTIs. In some aspects, the contention window 605 may correspond to steps 520, 525, 530, and 535 of process 500. The reserved resources 610 may encompass a plurality of shortened TTIs.

In some aspects, the long-term protection scheme may consist of two phases. Phase one may include contention window 605 where resources may be reserved for a certain time. Phase one allows the transmitting device to use multicast/unicast transmissions to create an exclusive radio resource zone by reserving resources in advance for priority communications. To reserve the resources for long-term, the transmitting device goes through the LBT mechanism during the contention period. Resource reservation can be performed for a defined time period (e.g., 100 ms) and in advance of the reserved resources 610. When the transmitting device reserves certain resources, it may indicate this in the form of a node identifier (ID) so that resources corresponding to that node and all nodes below it will be reserved. Some or all of the time and/or frequency resources in the window can be represented as a tree structure where a set of resources can be represented by a node ID. Participating devices may determine that it is interested in the multicast priority communications (e.g., multicast transmissions) based on the token ID in the scheduling assignment or that it is participating in unicast priority communications based on communication identifier. The participating devices respond by transmitting an acknowledgement signal based on the feedback mechanism. Once the participating devices send the acknowledgement for the reserved resources, the participating devices may transmit sCTS messages whenever there is sRTS message from the transmitting device in the reserved resources.

Phase two may include performing the priority communications using the reserved resources 610. In some aspects, the reserved resources 610 may be used according to a priority scheme. For example, first priority may be assigned to resources reserved using the described long-term reservation scheme for the transmitting device. Next, any unreserved priority communication resources may be used by any device participating in priority communications. Such devices may use a combination of random selection and sensing in the priority communication resources. Lastly, if there is no transmission of sRTS messages in the first symbol of a priority communication resource, then any other device that wants to transmit normal traffic can use the resource using LBT mechanism. Hence, from a typical UE point of view, the first symbol of the priority communication resource may always be monitored.

In some aspects, resource reservation based on the long-term reservation scheme for transmission of a back-to-back transmission/retransmission pair after reception of NACK may be performed. In the situation where no NACK is received, that portion of the reserved resource can be used by some other device (e.g., normal TTI following LBT mechanism).

In some aspects, contention window 605 may illustrate an example of a two TTI bundle duration. For example, contention window 605 may span the first TTI 615 and the second TTI 620. The two TTIs may include a period for an LBT 625, a period for control 630, a period for a first TTI data 635, a period for a second TTI data 640, and a period for a gap 645. Generally, a transmitting device may perform an LBT procedure during LBT 625 and transmit an indication (such as a reservation signal) that it is reserving a plurality of shortened TTIs during the control 630. The first TTI 635 and/or the second TTI 640 may be used for other communications, e.g. such as non-priority communications. The second TTI 620 may further include a control 650 in which devices wishing to participate in the priority communications may transmit at acknowledgment signal. Generally, the control 650 may provide for communicating acknowledgment/negative acknowledgment in the last symbol of the first TTI data 635-*b* for previous TTI bundling.

Accordingly, the transmitting device and participating devices who transmitted acknowledgment signals during control 650 may subsequently perform the priority communications using the reserved resources 610.

Figure 7:
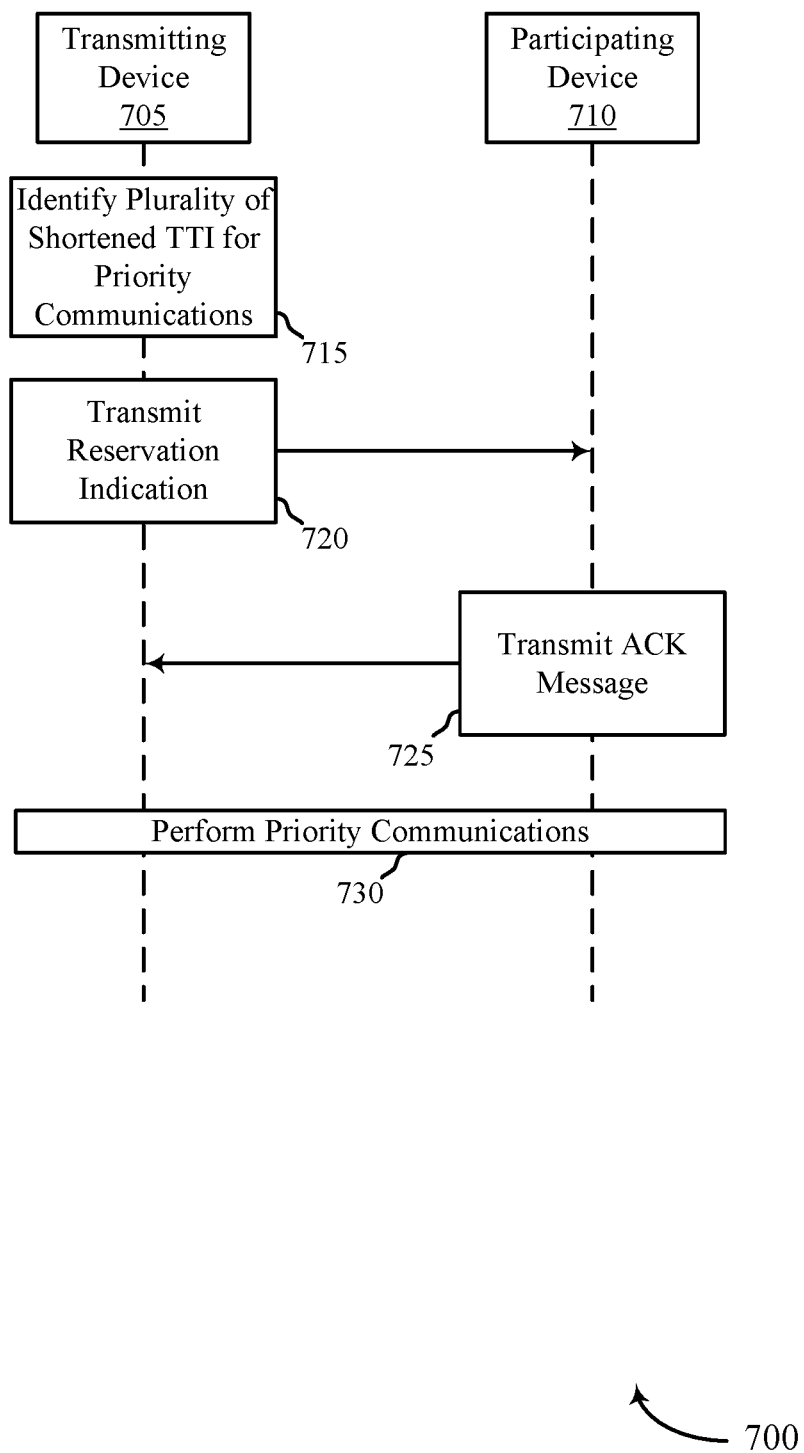
FIG. 7 illustrates an example of a process that supports V2X URLLC design in accordance with aspects of the present disclosure.

FIG. 7 illustrates an example of a process 700 that supports V2X URLLC design in accordance with various aspects of the present disclosure. In some examples, process 700 may implement aspects of wireless communication system 100, resource configurations 200/300/600, and/or processes 400/500. Process 700 may include a transmitting device 705 and a participating device 710, which may be examples of the corresponding devices described herein. Generally, process 700 illustrates an example process that can be used for long-term resource reservation.

At 715, transmitting device 705 may identify a plurality of shortened TTIs to be used for priority communications. The priority communications may include communications with the vehicle having a first traffic priority level. The plurality of shortened TTIs may each have a duration that is less than that of other TTIs used in other communications. For example, the other communications may include non-priority communications with the vehicle having a second traffic priority level. The second traffic priority level may be less than the first traffic priority level.

At 720, transmitting device 705 may begin performing an LBT procedure in order to reserve the plurality of shortened TTIs by transmitting a reservation indication. In some aspects, the LBT procedure may be performed using the other TTIs having the second traffic priority level. In some aspects, the reservation indication may include or otherwise provide an indication of a node of a resource tree, where each node of the resource tree is associated with some or all of a set of available time and/or frequency resources that include the plurality of shortened TTIs. For example, the reservation indication may include or otherwise provide an indication of which node that transmitting device 705 is reserving. In some aspects, the reservation indication may be provided in a scheduling assignment message, or MAC CE, in a RRC message, and the like At 725, participating device 710 may respond to the reservation indication by transmitting an acknowledgment message to the transmitting device 705. In some aspects, transmitting device 705 may receive multiple acknowledgment messages from different devices wishing to participate in the priority communications.

At 730, transmitting device 705 and participating device 710 may perform the priority communications by performing, for at least one instance of the plurality of shortened TTIs, and RTS/CTS exchange to further reserved that instance.

Figure 8:
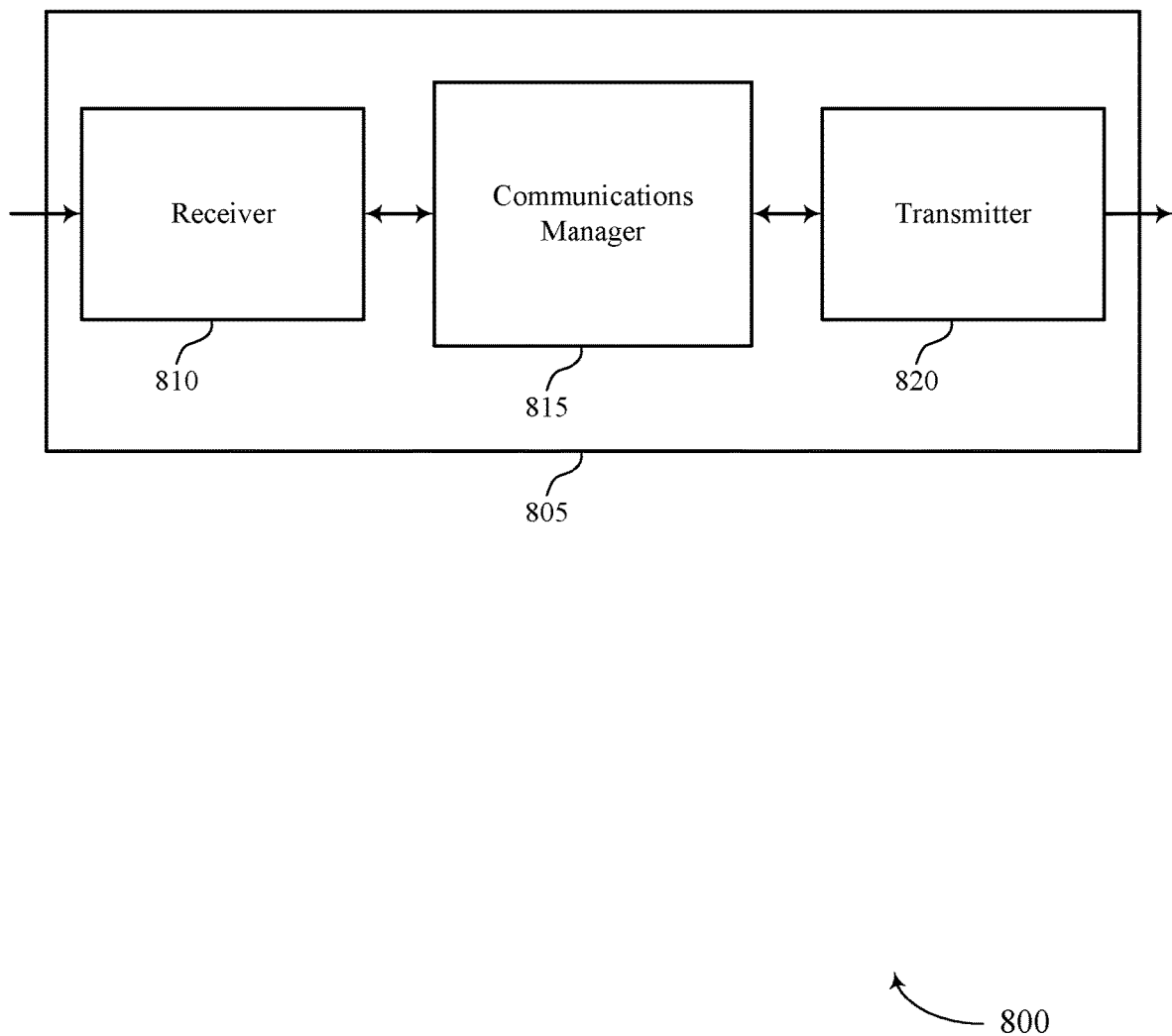
FIGS. 8 through 10 show block diagrams of a device that supports V2X URLLC design in accordance with aspects of the present disclosure.

FIG. 8 shows a block diagram 800 of a wireless device 805 that supports V2X URLLC design in accordance with aspects of the present disclosure. Wireless device 805 may be an example of aspects of a UE 115 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to V2X URLLC design, etc.). Information may be passed on to other components of the device. The receiver 810 may be an example of aspects of the transceiver 1135 described with reference to FIG. 11. The receiver 810 may utilize a single antenna or a set of antennas.

Communications manager 815 may be an example of aspects of the communications manager 1115 described with reference to FIG. 11.

Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may identify a shortened TTI to be used for priority communications to or from a vehicle having a first traffic priority level, the shortened TTI having a duration that is less than that of other TTIs used in other communications to or from the vehicle having a second traffic priority level which is less than the first traffic priority level, transmit an RTS message during the shortened TTI, the RTS message indicating an identifier and a configuration for the priority communications during the shortened TTI, receive a CTS message from one or more wireless devices participating in the priority communications, the CTS message indicating a sequence associating the CTS message with the RTS message, and perform the priority communications with the wireless devices from which the CTS messages were received.

The communications manager 815 may also receive an RTS message from a wireless device during a shortened TTI reserved for use for priority communications to or from a vehicle having a first traffic priority level, the shortened TTI having a duration that is less than that of other TTIs used in other communications to or from the vehicle having a second traffic priority level which is less than the first traffic priority level, the RTS message indicating an identifier and a configuration for the priority communications during the shortened TTI, identify a sequence based on the RTS message, transmit a CTS message indicating the sequence and using a set of RBs having a same number of RBs as is used for the RTS message, where the sequence associates the CTS message with the RTS message, and perform the priority communications with the wireless device from which the RTS message was received.

The communications manager 815 may also identify a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level, perform an LBT procedure in order to reserve the set of shortened TTIs for the priority communications, and perform, for at least one instance of the set of shortened TTIs, an RTS/CTS exchange to further reserve the at least one instance of the set of shortened TTIs for the priority communications.

The communications manager 815 may also receive, during an LBT procedure, an indication reserving a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level, transmit, during the LBT procedure, an ACK message responsive to the indication, and perform, during at least one instance of the set of shortened TTIs, an RTS/CTS exchange to reserve the at least one instance of the set of shortened TTIs for the priority communications.

The communications manager 815 may also receive, during an LBT procedure, an indication reserving a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level, determine that an RTS message is not transmitted during a first symbol in at least one of the shortened TTIs, and perform an LBT procedure on another TTI overlapping the at least one shortened TTI to reserve the other TTI for other communications having the second traffic priority.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
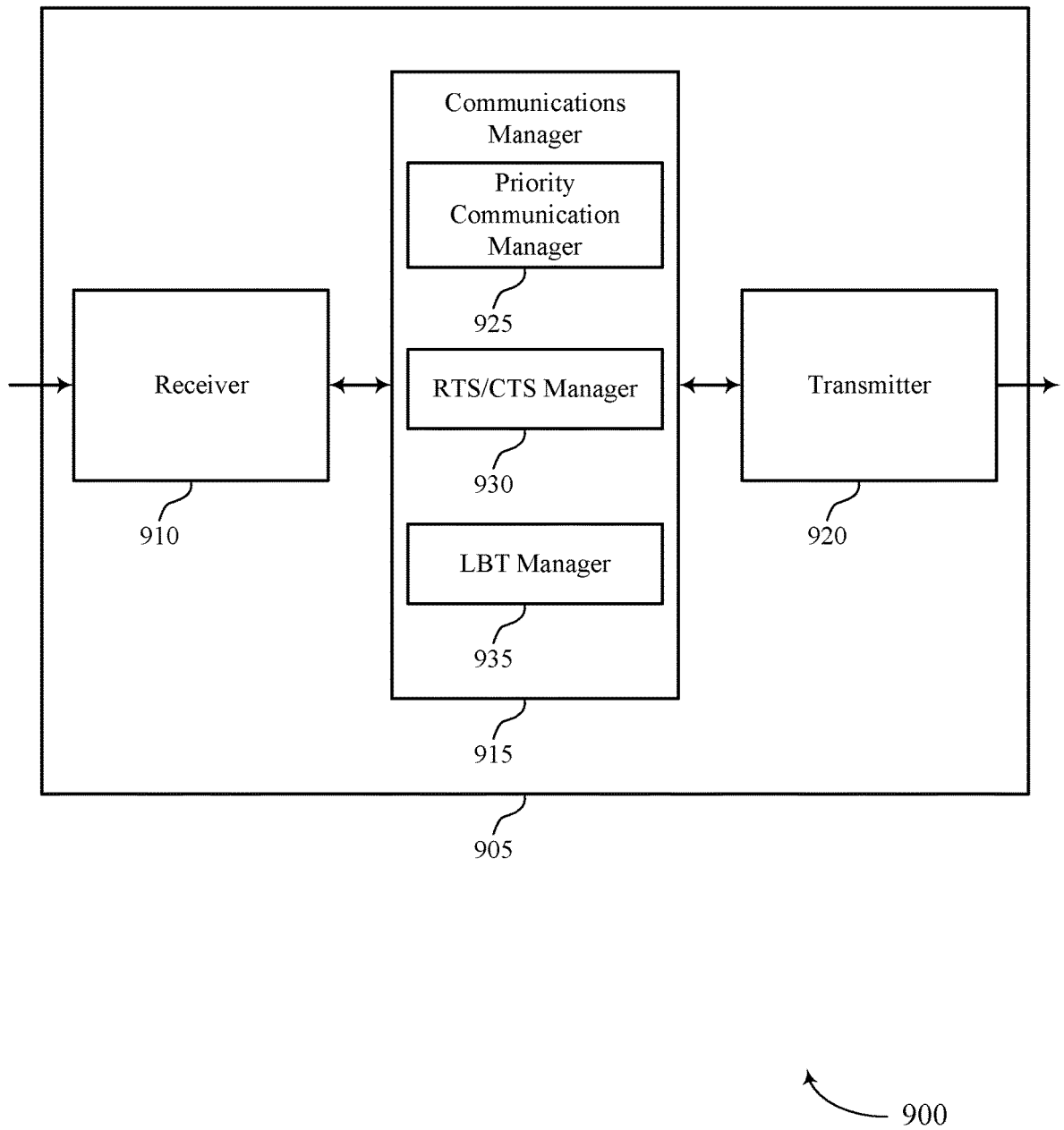

FIG. 9 shows a block diagram 900 of a wireless device 905 that supports V2X URLLC design in accordance with aspects of the present disclosure. Wireless device 905 may be an example of aspects of a wireless device 805 or a UE 115 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to V2X URLLC design, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11.

Communications manager 915 may also include priority communication manager 925, RTS/CTS manager 930, and LBT manager 935.

Priority communication manager 925 may identify a shortened TTI to be used for priority communications to or from a vehicle having a first traffic priority level, the shortened TTI having a duration that is less than that of other TTIs used in other communications to or from the vehicle having a second traffic priority level which is less than the first traffic priority level. Priority communication manager 925 may perform the priority communications with the wireless devices from which the CTS messages were received. Priority communication manager 925 may determine whether to perform the priority communications with the wireless devices based on the other CTS messages. Priority communication manager 925 may transmit a control message after receiving the CTS message and prior to performing the priority communications. Priority communication manager 925 may perform the priority communications with the wireless device from which the RTS message was received, receive a control message after transmitting the CTS message and prior to performing the priority communications. Priority communication manager 925 may identify a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level.

RTS/CTS manager 930 may transmit an RTS message during the shortened TTI, the RTS message indicating an identifier and a configuration for the priority communications during the shortened TTI. RTS/CTS manager 930 may receive a CTS message from one or more wireless devices participating in the priority communications, the CTS message indicating a sequence associating the CTS message with the RTS message. RTS/CTS manager 930 may receive an RTS message from a wireless device during a shortened TTI reserved for use for priority communications to or from a vehicle having a first traffic priority level, the shortened TTI having a duration that is less than that of other TTIs used in other communications to or from the vehicle having a second traffic priority level which is less than the first traffic priority level, the RTS message indicating an identifier and a configuration for the priority communications during the shortened TTI.

RTS/CTS manager 930 may identify a sequence based on the RTS message. RTS/CTS manager 930 may transmit a CTS message indicating the sequence and using a set of RBs having a same number of RBs as is used for the RTS message, where the sequence associates the CTS message with the RTS message. RTS/CTS manager 930 may perform, for at least one instance of the set of shortened TTIs, an RTS/CTS exchange to further reserve the at least one instance of the set of shortened TTIs for the priority communications. RTS/CTS manager 930 may perform, during at least one instance of the set of shortened TTIs, an RTS/CTS exchange to reserve the at least one instance of the set of shortened TTIs for the priority communications. RTS/CTS manager 930 may decode the RTS message to identify control information for the priority communications. RTS/CTS manager 930 may determine that an RTS message is not transmitted during a first symbol in at least one of the shortened TTIs. RTS/CTS manager 930 may configure, based on the configuration, the RTS message to provide an indication of control information for the priority communications. RTS/CTS manager 930 may transmit a CTS message for participating in the priority communications, the CTS message indicating a sequence associating the CTS message with the RTS message.

In some cases, transmitting the RTS message includes: transmitting two half-symbol instances of the RTS message during a symbol. In some cases, the RTS is a sRTS and the CTS is a sCTS. In some cases, the RTS is a sRTS and the CTS is a sCTS. In some cases, performing the RTS/CTS exchange includes: performing the RTS/CTS exchange for only a portion of the set of shortened TTIs, where shortened TTIs other than the portion are available for other communications having the second traffic priority level. In some cases, performing the RTS/CTS exchange includes: performing the RTS/CTS exchange for only a portion of the set of shortened TTIs based on an absence of receiving a NACK in response to the priority communications. In some cases, performing the RTS/CTS exchange includes: receiving an RTS message during the at least one instance of the set of shortened TTIs, the RTS message indicating an identifier and a configuration for the priority communications. In some cases, the configuration for the priority communications includes an indication of whether the RTS is a control RTS or a control-less RTS.

LBT manager 935 may perform an LBT procedure in order to reserve the set of shortened TTIs for the priority communications. LBT manager 935 may receive, during an LBT procedure, an indication reserving a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level. LBT manager 935 may transmit, during the LBT procedure, an ACK message responsive to the indication. LBT manager 935 may perform an LBT procedure on another TTI overlapping the at least one shortened TTI to reserve the other TTI for other communications having the second traffic priority. In some cases, performing the LBT procedure further includes: performing the LBT procedure using the other TTIs having the second traffic priority level.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
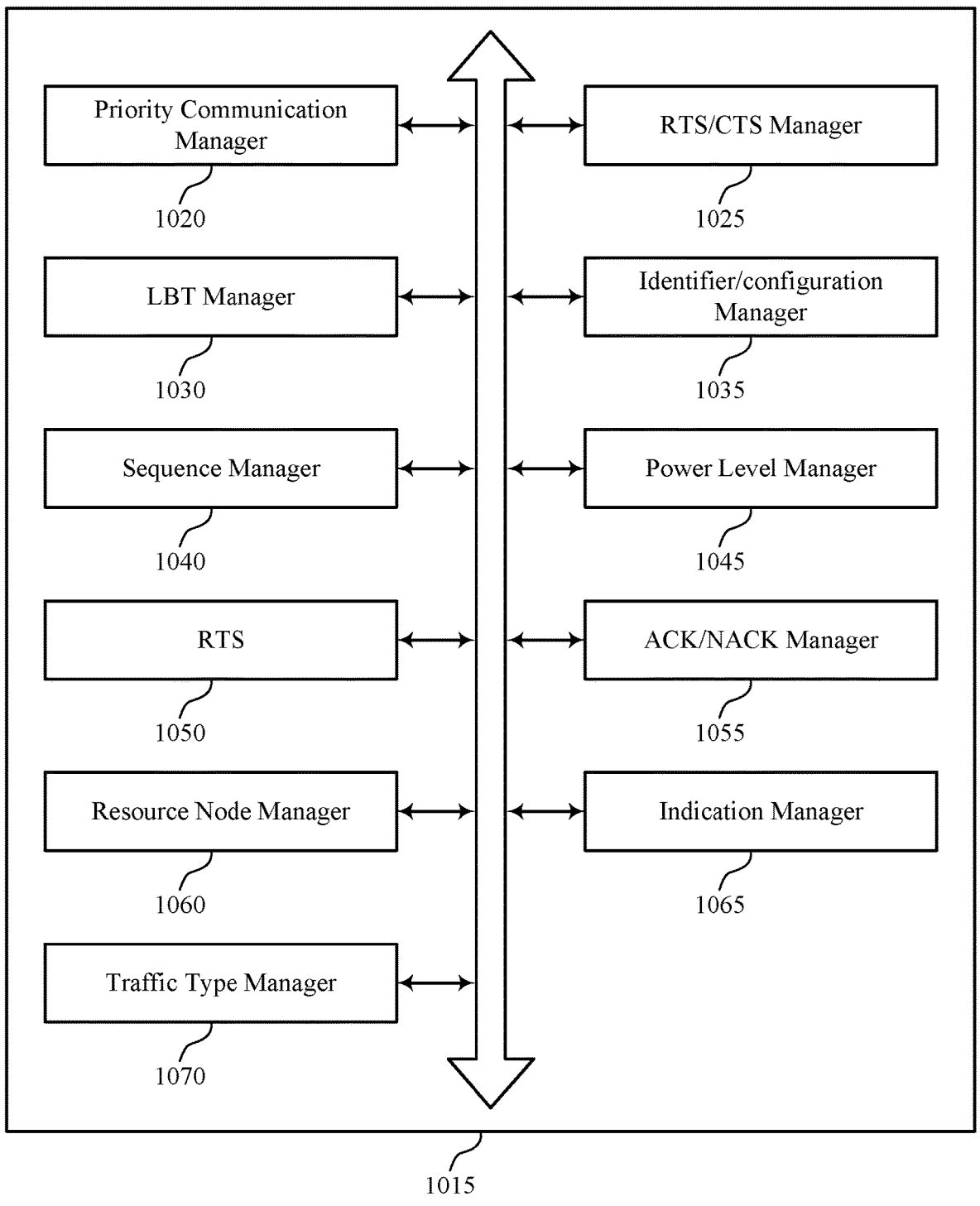

FIG. 10 shows a block diagram 1000 of a communications manager 1015 that supports V2X URLLC design in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include priority communication manager 1020, RTS/CTS manager 1025, LBT manager 1030, identifier/configuration manager 1035, sequence manager 1040, power level manager 1045, RTS 1050, ACK/NACK manager 1055, resource node manager 1060, indication manager 1065, and traffic type manager 1070. Each of these modules may communicate, directly or indirectly, with one another (e.g., via one or more buses).

Priority communication manager 1020 may identify a shortened TTI to be used for priority communications to or from a vehicle having a first traffic priority level, the shortened TTI having a duration that is less than that of other TTIs used in other communications to or from the vehicle having a second traffic priority level which is less than the first traffic priority level. Priority communication manager 1020 may perform the priority communications with the wireless devices from which the CTS messages were received. Priority communication manager 1020 may determine whether to perform the priority communications with the wireless devices based on the other CTS messages. Priority communication manager 1020 may transmit a control message after receiving the CTS message and prior to performing the priority communications. Priority communication manager 1020 may perform the priority communications with the wireless device from which the RTS message was received. Priority communication manager 1020 may receive a control message after transmitting the CTS message and prior to performing the priority communications. Priority communication manager 1020 may identify a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level.

RTS/CTS manager 1025 may transmit an RTS message during the shortened TTI, the RTS message indicating an identifier and a configuration for the priority communications during the shortened TTI. RTS/CTS manager 1025 may receive a CTS message from one or more wireless devices participating in the priority communications, the CTS message indicating a sequence associating the CTS message with the RTS message. RTS/CTS manager 1025 may receive an RTS message from a wireless device during a shortened TTI reserved for use for priority communications to or from a vehicle having a first traffic priority level, the shortened TTI having a duration that is less than that of other TTIs used in other communications to or from the vehicle having a second traffic priority level which is less than the first traffic priority level, the RTS message indicating an identifier and a configuration for the priority communications during the shortened TTI.

RTS/CTS manager 1025 may identify a sequence based on the RTS message. RTS/CTS manager 1025 may transmit a CTS message indicating the sequence and using a set of RBs having a same number of RBs as is used for the RTS message, where the sequence associates the CTS message with the RTS message. RTS/CTS manager 1025 may perform, for at least one instance of the set of shortened TTIs, an RTS/CTS exchange to further reserve the at least one instance of the set of shortened TTIs for the priority communications. RTS/CTS manager 1025 may perform, during at least one instance of the set of shortened TTIs, an RTS/CTS exchange to reserve the at least one instance of the set of shortened TTIs for the priority communications. RTS/CTS manager 1025 may decode the RTS message to identify control information for the priority communications. RTS/CTS manager 1025 may determine that an RTS message is not transmitted during a first symbol in at least one of the shortened TTIs. RTS/CTS manager 1025 may configure, based on the configuration, the RTS message to provide an indication of control information for the priority communications. RTS/CTS manager 1025 may transmit a CTS message for participating in the priority communications, the CTS message indicating a sequence associating the CTS message with the RTS message.

In some cases, transmitting the RTS message includes: transmitting two half-symbol instances of the RTS message during a symbol. In some cases, the RTS is a sRTS and the CTS is a sCTS. In some cases, the RTS is a sRTS and the CTS is a sCTS. In some cases, performing the RTS/CTS exchange includes: performing the RTS/CTS exchange for only a portion of the set of shortened TTIs, where shortened TTIs other than the portion are available for other communications having the second traffic priority level. In some cases, performing the RTS/CTS exchange includes: performing the RTS/CTS exchange for only a portion of the set of shortened TTIs based on an absence of receiving a NACK in response to the priority communications. In some cases, performing the RTS/CTS exchange includes: receiving an RTS message during the at least one instance of the set of shortened TTIs, the RTS message indicating an identifier and a configuration for the priority communications. In some cases, the configuration for the priority communications includes an indication of whether the RTS is a control RTS or a control-less RTS.

LBT manager 1030 may perform an LBT procedure in order to reserve the set of shortened TTIs for the priority communications, receive. LBT manager 1030 may during an LBT procedure, an indication reserving a set of shortened TTIs to be used for priority communications to or from a vehicle having a first traffic priority level, the set of shortened TTIs each having a duration that is less than that of other TTIs used in other communications to or from the vehicle having a second traffic priority level which is less than the first traffic priority level. LBT manager 1030 may transmit, during the LBT procedure, an ACK message responsive to the indication. LBT manager 1030 may perform an LBT procedure on another TTI overlapping the at least one shortened TTI to reserve the other TTI for other communications having the second traffic priority. In some cases, performing the LBT procedure further includes: performing the LBT procedure using the other TTIs having the second traffic priority level.

Identifier/configuration manager 1035 may transmit the RTS message in a first symbol set of the shortened TTI using a same number of RBs as will be used for control and data transmissions for the priority communications. Identifier/configuration manager 1035 may receive a CTS message from one or more wireless devices participating in the priority communications, the CTS message indicating a sequence associating the CTS message with the RTS message. In some cases, the configuration for the priority communications includes an indication of whether the RTS is a control RTS or a control-less RTS. In some cases, performing the RTS/CTS exchange includes: transmitting an RTS message during the at least one instance of the set of shortened TTIs, the RTS message indicating an identifier and a configuration for the priority communications.

Sequence manager 1040 may receive other CTS messages that include sequences that do not associate the CTS message with the RTS message. Sequence manager 1040 may determine the sequence based on the identifier. In some cases, identifying the sequence includes: determining the sequence based on time-frequency resources of the shortened TTI on which the RTS message was received.

Power level manager 1045 may determine that the CTS message is received at a power level of at least one of a threshold power level of total energy or at a power level greater than the power level at which the other CTS messages are received. Power level manager 1045 may perform the priority communications based on the determining. Power level manager 1045 may transmit the RTS message at a defined transmit power level. Power level manager 1045 may receive the CTS message at a receive power level based on the defined transmit power level. Power level manager 1045 may receive the RTS message at a receive power level. Power level manager 1045 may transmit the CTS message at a transmit power level based on the receive power level.

RTS 1050 may manage aspects of receiving the RTS message includes: receiving two half-symbol instances of the RTS message during a symbol.

ACK/NACK manager 1055 may receive, during the LBT procedure, an ACK message from one or more UEs to participate in the priority communications. ACK/NACK manager 1055 may perform the priority communications with the UEs from which ACK messages were received. ACK/NACK manager 1055 may refrain from transmitting an acknowledgement message during the LBT procedure. In some cases, receiving the indication further includes: determining, based on the indication, not to participate in the communications to or from the vehicle having the first traffic priority level.

Resource node manager 1060 may select the node of the resource tree based on the set of shortened TTIs. In some cases, performing the LBT procedure includes: identifying a resource tree that includes a set of nodes, each node of the resource tree associated with some or all of a set of available time-frequency resources that include the set of shortened TTIs. In some cases, receiving the indication reserving the set of shortened TTIs includes: identifying a resource tree that includes a set of nodes, each node of the resource tree associated with some or all of a set of available time-frequency resources including the set of shortened TTIs.

Indication manager 1065 may configure one or more of a SA message, or a MAC CE, or a RRC message to provide an indication in the LBT procedure reserving the set of shortened TTIs. Indication manager 1065 may decode one or more of a scheduling assignment (SA) message, or a MAC CE, or a RRC message to identify the indication reserving the set of shortened TTIs. In some cases, receiving the indication further includes: receiving the indication on the other TTIs having the second traffic priority level. In some cases, receiving the indication further includes: receiving the indication on the other TTIs having the second traffic priority level.

Traffic type manager 1070 may determine that the priority communications include periodic traffic satisfying a threshold, where performing the LBT procedure is based on the periodic traffic satisfying the threshold.

Figure 11:
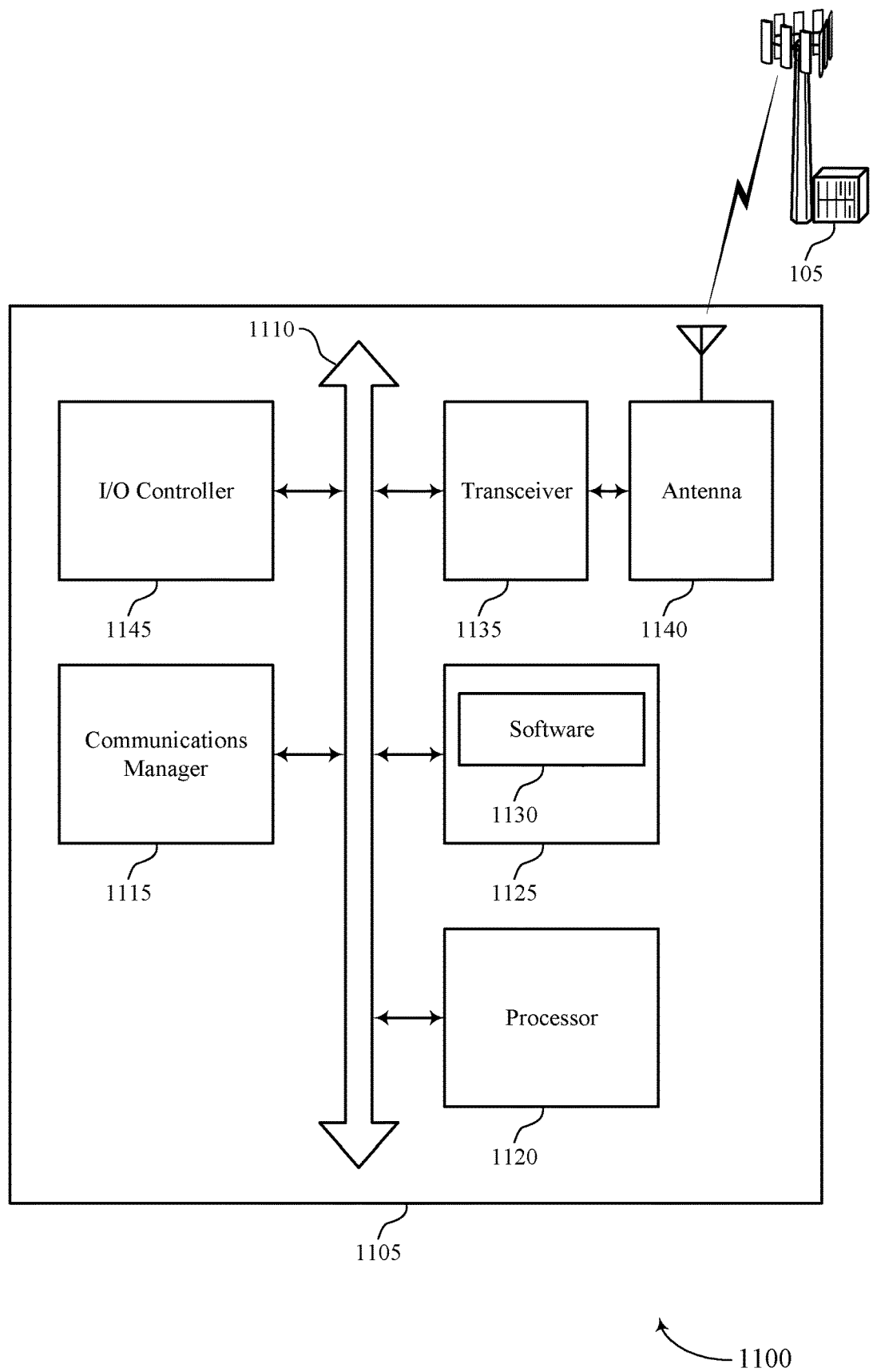
FIG. 11 illustrates a block diagram of a system including a UE that supports V2X URLLC design in accordance with aspects of the present disclosure.

FIG. 11 shows a diagram of a system 1100 including a device 1105 that supports V2X URLLC design in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting V2X URLLC design).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support V2X URLLC design. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
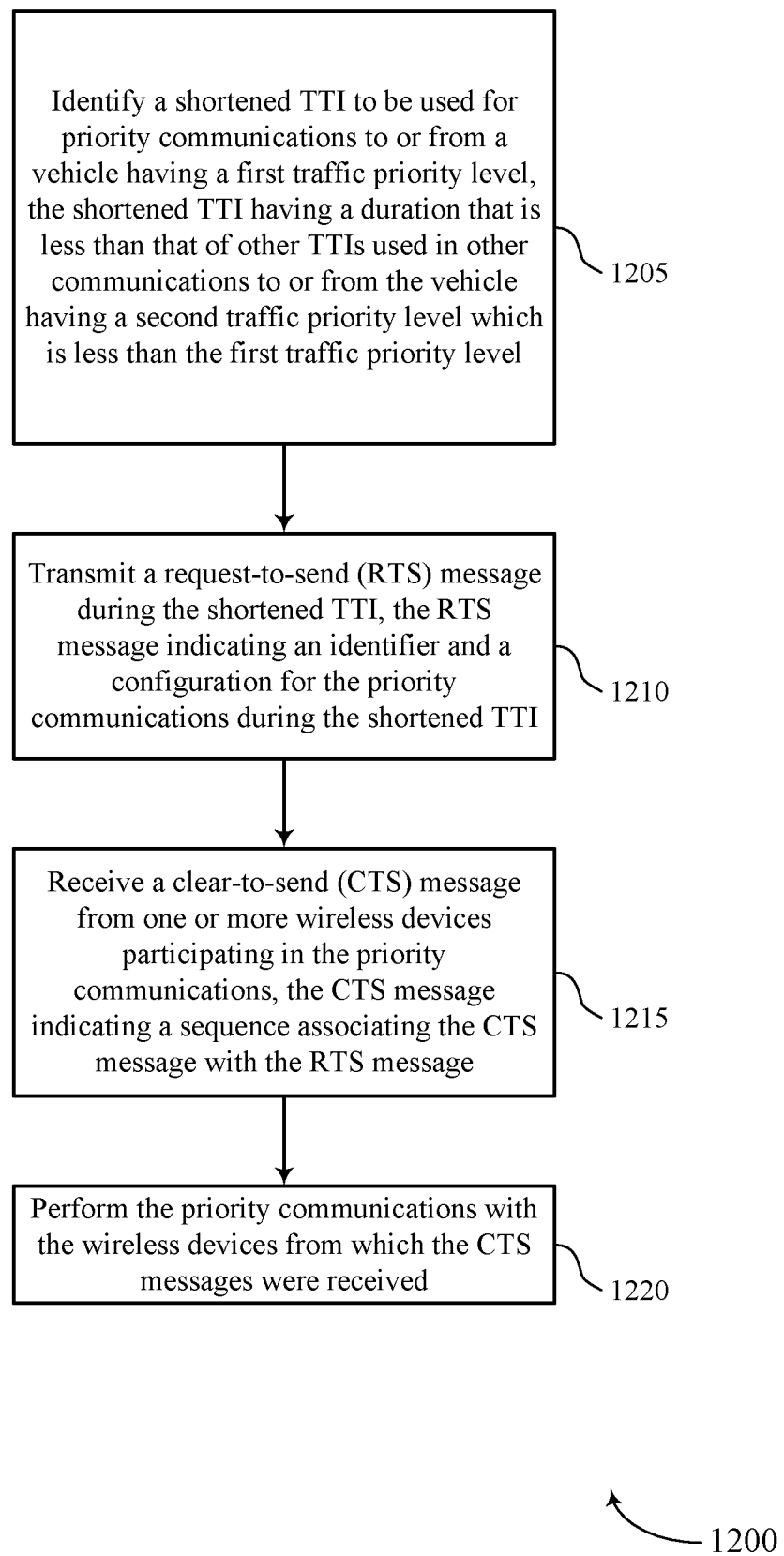
FIGS. 12 through 16 illustrate methods for V2X URLLC design in accordance with aspects of the present disclosure.

FIG. 12 shows a flowchart illustrating a method 1200 for V2X URLLC design in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may identify a shortened TTI to be used for priority communications to or from a vehicle having a first traffic priority level, the shortened TTI having a duration that is less than that of other TTIs used in other communications to or from the vehicle having a second traffic priority level which is less than the first traffic priority level. The operations of 1205 may be performed according to the methods described herein. In certain examples, aspects of the operations of 1205 may be performed by a priority communication manager as described with reference to FIGS. 8 through 11.

At 1210 the UE 115 may transmit an RTS message during the shortened TTI, the RTS message indicating an identifier and a configuration for the priority communications during the shortened TTI. The operations of 1210 may be performed according to the methods described herein. In certain examples, aspects of the operations of 1210 may be performed by an RTS/CTS manager as described with reference to FIGS. 8 through 11.

At 1215 the UE 115 may receive a CTS message from one or more wireless devices participating in the priority communications, the CTS message indicating a sequence associating the CTS message with the RTS message. The operations of 1215 may be performed according to the methods described herein. In certain examples, aspects of the operations of 1215 may be performed by an RTS/CTS manager as described with reference to FIGS. 8 through 11.

At 1220 the UE 115 may perform the priority communications with the wireless devices from which the CTS messages were received. The operations of 1220 may be performed according to the methods described herein. In certain examples, aspects of the operations of 1220 may be performed by a priority communication manager as described with reference to FIGS. 8 through 11.

Figure 13:
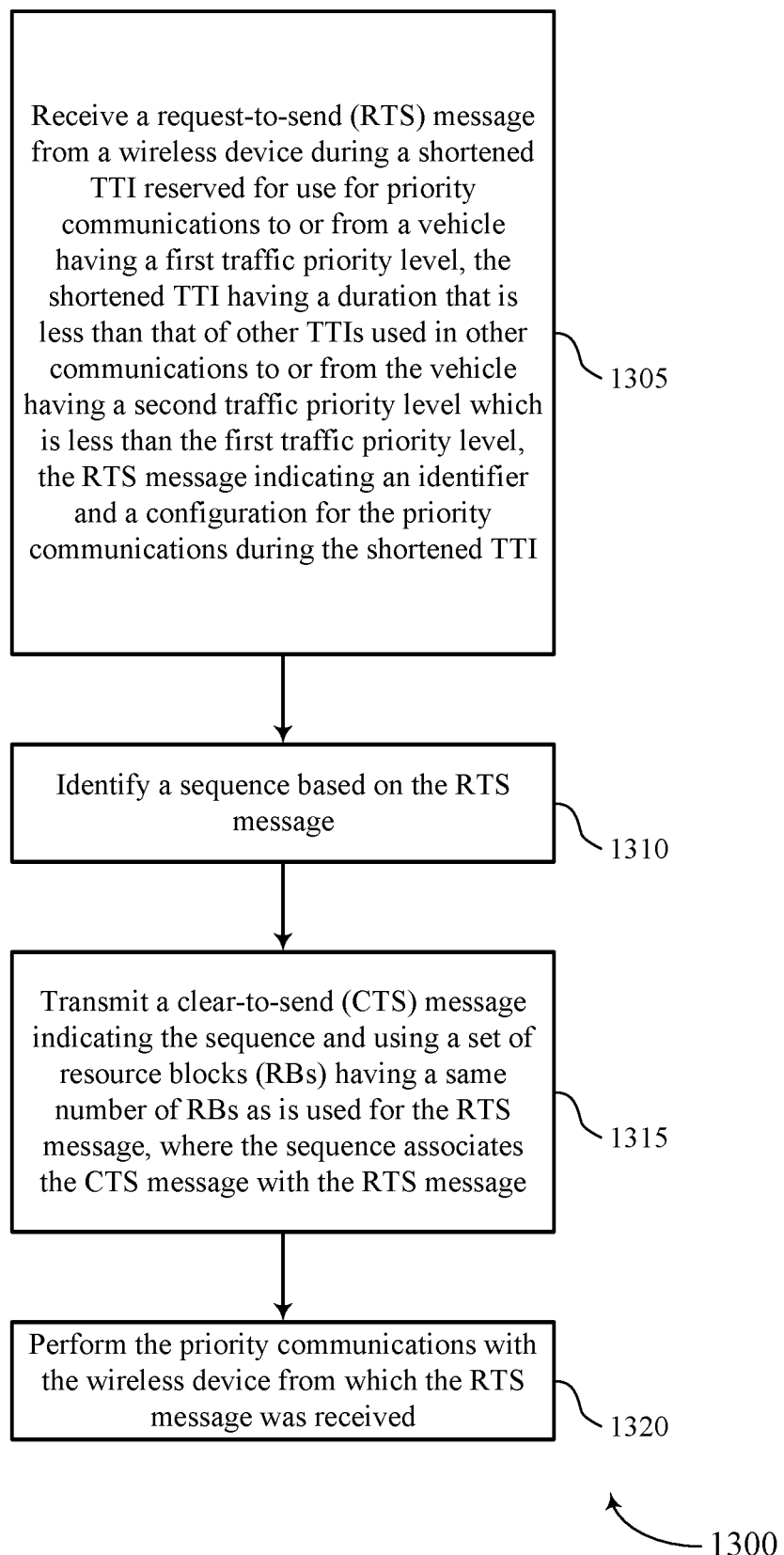

FIG. 13 shows a flowchart illustrating a method 1300 for V2X URLLC design in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive an RTS message from a wireless device during a shortened TTI reserved for use for priority communications to or from a vehicle having a first traffic priority level, the shortened TTI having a duration that is less than that of other TTIs used in other communications to or from the vehicle having a second traffic priority level which is less than the first traffic priority level, the RTS message indicating an identifier and a configuration for the priority communications during the shortened TTI. The operations of 1305 may be performed according to the methods described herein. In certain examples, aspects of the operations of 1305 may be performed by an RTS/CTS manager as described with reference to FIGS. 8 through 11.

At 1310 the UE 115 may identify a sequence based at least in part on the RTS message. The operations of 1310 may be performed according to the methods described herein. In certain examples, aspects of the operations of 1310 may be performed by an RTS/CTS manager as described with reference to FIGS. 8 through 11.

At 1315 the UE 115 may transmit a CTS message indicating the sequence and using a set of RBs having a same number of RBs as is used for the RTS message, wherein the sequence associates the CTS message with the RTS message. The operations of 1315 may be performed according to the methods described herein. In certain examples, aspects of the operations of 1315 may be performed by an RTS/CTS manager as described with reference to FIGS. 8 through 11.

At 1320 the UE 115 may perform the priority communications with the wireless device from which the RTS message was received. The operations of 1320 may be performed according to the methods described herein. In certain examples, aspects of the operations of 1320 may be performed by a priority communication manager as described with reference to FIGS. 8 through 11.

Figure 14:
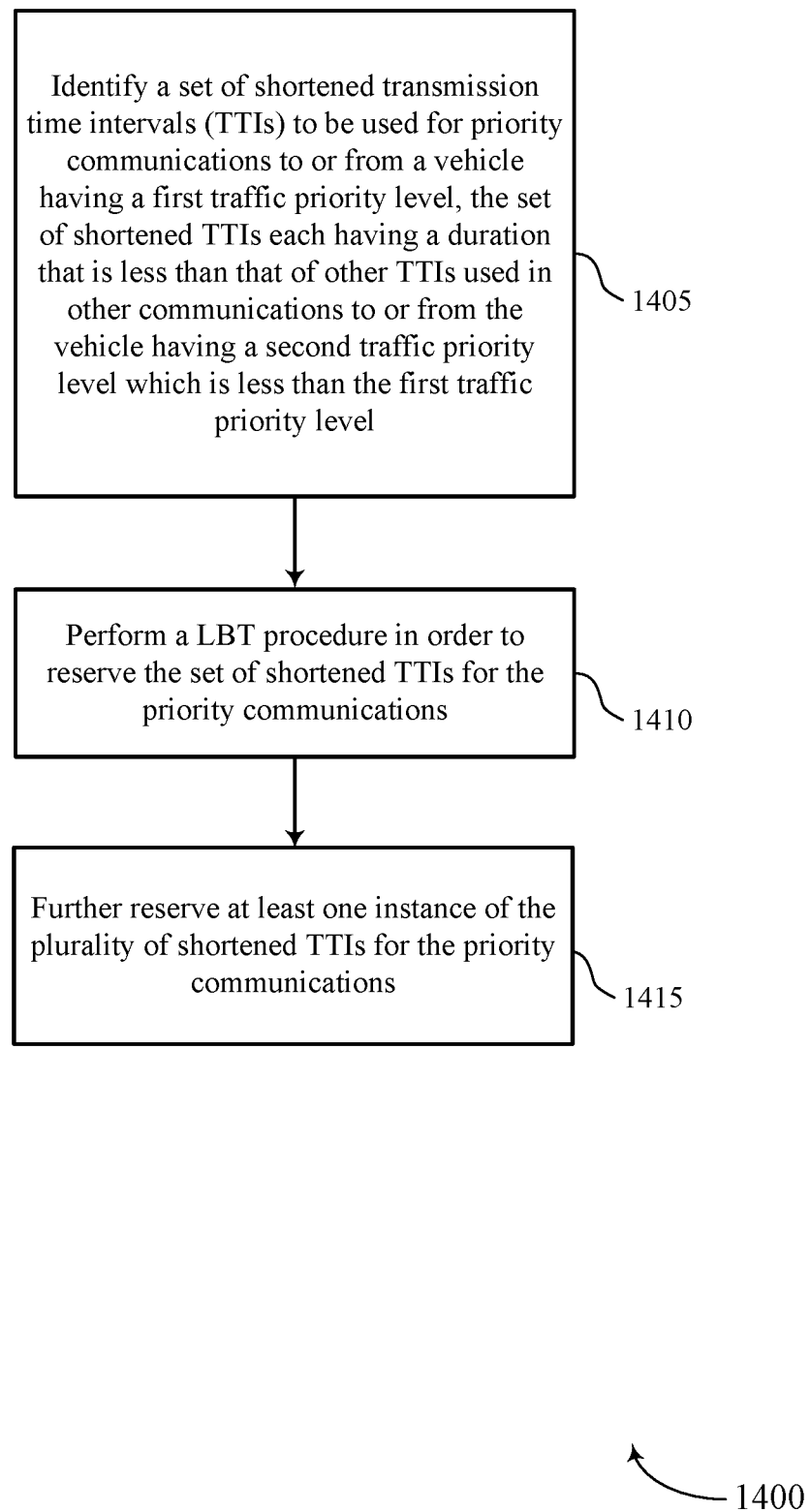

FIG. 14 shows a flowchart illustrating a method 1400 for V2X URLLC design in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The operations of 1405 may be performed according to the methods described herein. In certain examples, aspects of the operations of 1405 may be performed by a priority communication manager as described with reference to FIGS. 8 through 11.

At 1410 the UE 115 may perform an LBT procedure in order to reserve the plurality of shortened TTIs for the priority communications. The operations of 1410 may be performed according to the methods described herein. In certain examples, aspects of the operations of 1410 may be performed by an LBT manager as described with reference to FIGS. 8 through 11.

At 1415 the UE 115 may further reserve at least one instance of the plurality of shortened TTIs for the priority communications. The operations of 1415 may be performed according to the methods described herein. In certain examples, aspects of the operations of 1415 may be performed by an RTS/CTS manager as described with reference to FIGS. 8 through 11.

Figure 15:
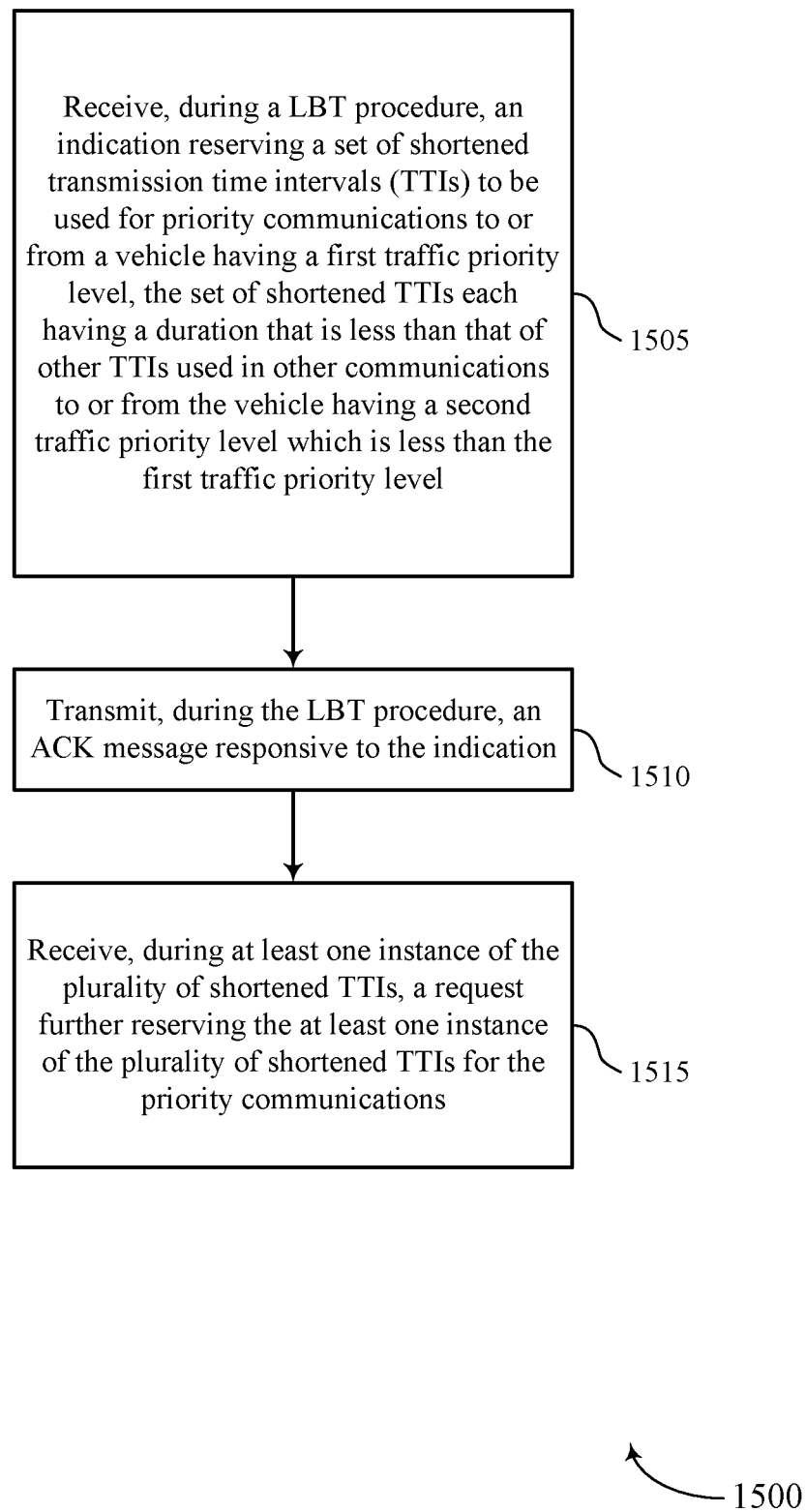

FIG. 15 shows a flowchart illustrating a method 1500 for V2X URLLC design in accordance with aspects of the present disclosure. The operations of method 1500 may be implemented by a UE 115 or its components as described herein. For example, the operations of method 1500 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, during an LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The operations of 1505 may be performed according to the methods described herein. In certain examples, aspects of the operations of 1505 may be performed by an LBT manager as described with reference to FIGS. 8 through 11.

At 1510 the UE 115 may transmit, during the LBT procedure, an ACK message responsive to the indication. The operations of 1510 may be performed according to the methods described herein. In certain examples, aspects of the operations of 1510 may be performed by an LBT manager as described with reference to FIGS. 8 through 11.

At 1515 the UE 115 may receive, during at least one instance of the plurality of shortened TTIs, a request further reserving the at least one instance of the plurality of shortened TTIs for the priority communications. The operations of 1515 may be performed according to the methods described herein. In certain examples, aspects of the operations of 1515 may be performed by an RTS/CTS manager as described with reference to FIGS. 8 through 11.

Figure 16:
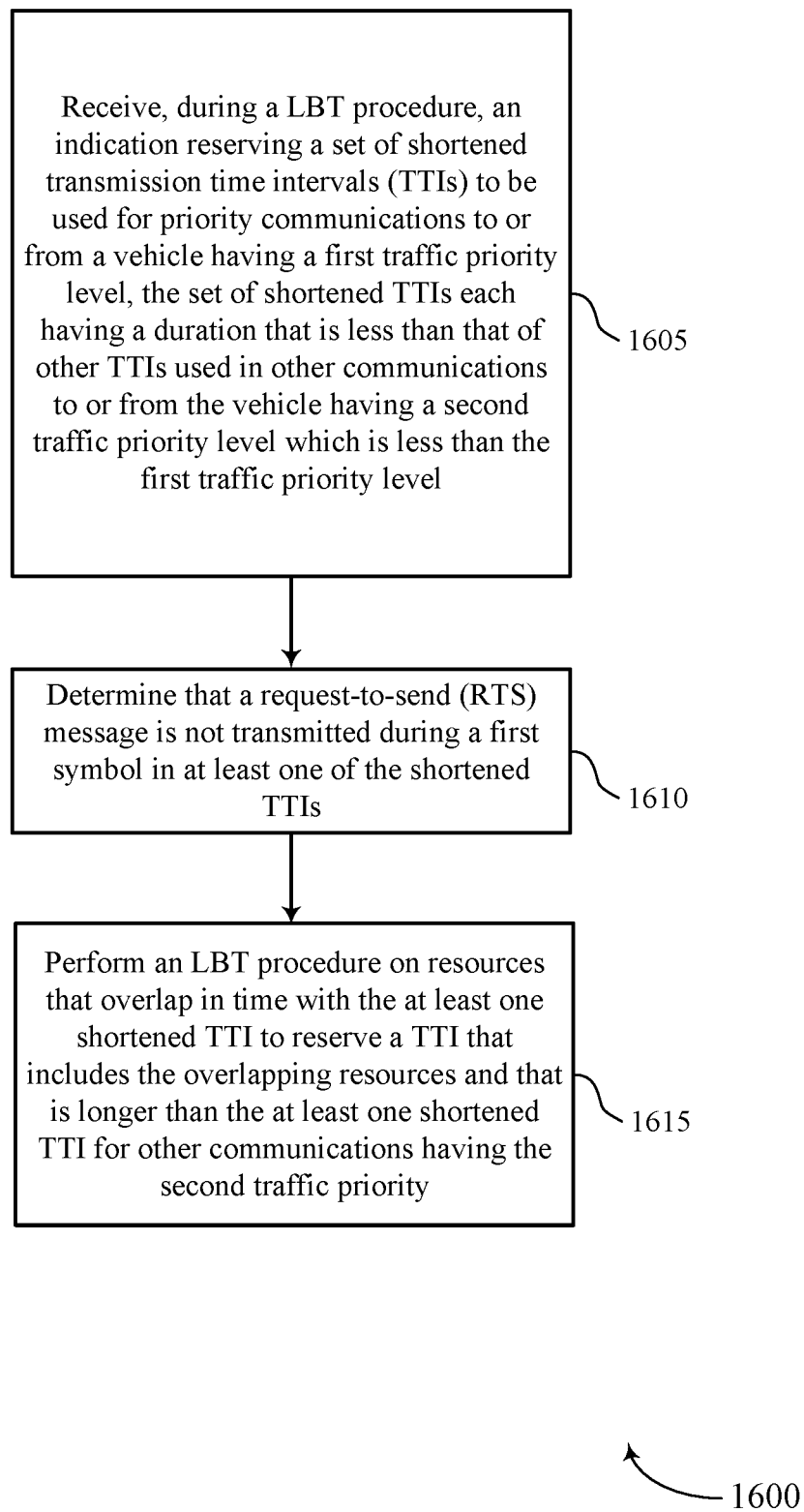

FIG. 16 shows a flowchart illustrating a method 1600 for V2X URLLC design in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, during an LBT procedure, an indication reserving a plurality of shortened TTIs to be used for priority communications to or from a vehicle having a first traffic priority level, the plurality of shortened TTIs each having a duration that is less than that of other TTIs used in other communications to or from the vehicle having a second traffic priority level which is less than the first traffic priority level. The operations of 1605 may be performed according to the methods described herein. In certain examples, aspects of the operations of 1605 may be performed by an LBT manager as described with reference to FIGS. 8 through 11.

At 1610 the UE 115 may determine that an RTS message is not transmitted during a first symbol in at least one of the shortened TTIs. The operations of 1610 may be performed according to the methods described herein. In certain examples, aspects of the operations of 1610 may be performed by an RTS/CTS manager as described with reference to FIGS. 8 through 11.

At 1615 the UE 115 may perform an LBT procedure on resources that overlap in time with the at least one shortened TTI to reserve a TTI that includes the overlapping resources and that is longer than the at least one shortened TTI for other communications having the second traffic priority. The operations of 1615 may be performed according to the methods described herein. In certain examples, aspects of the operations of 1615 may be performed by an LBT manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a plurality of shortened transmission time intervals (TTIs) to be used for priority communications to or from a vehicle having a first traffic priority level, the plurality of shortened TTIs each having a duration that is less than that of other TTIs used in other communications to or from the vehicle having a second traffic priority level which is less than the first traffic priority level;
   performing a listen-before-talk (LBT) procedure in order to reserve the plurality of shortened TTIs for the priority communications; and
   further reserving via a request-to-send/clear-to-send (RTS/CTS) exchange, at least one instance of the plurality of shortened TTIs for the priority communications based at least in part on the LBT procedure, wherein the RTS/CTS exchange is performed for only a portion of the plurality of shortened TTIs, wherein shortened TTIs other than the portion are available for other communications having the second traffic priority level.

2. The method of claim 1, wherein the further reserving comprises transmitting a request to reserve the at least one instance of the plurality of shortened TTIs for the priority communication.

3. The method of claim 1, wherein performing the LBT procedure further comprises:
   performing the LBT procedure using the other TTIs having the second traffic priority level.

4. The method of claim 1, further comprising:
   receiving, during the LBT procedure, an acknowledgement (ACK) message from one or more UEs to participate in the priority communications; and
   performing the priority communications with the UEs from which ACK messages were received.

5. The method of claim 1, wherein performing the LBT procedure comprises:
   identifying a resource tree that comprises a plurality of nodes, each node of the resource tree associated with some or all of a set of available time-frequency resources that include the plurality of shortened TTIs; and
   selecting the node of the resource tree based at least in part on the plurality of shortened TTIs.

6. The method of claim 1, further comprising:
   configuring one or more of a scheduling assignment (SA) message, or a medium access control (MAC) control element (CE), or a radio resource control (RRC) message to provide an indication in the LBT procedure reserving the plurality of shortened TTIs.

7. The method of claim 1, further comprising:
performing the RTS/CTS exchange for only the portion of the plurality of shortened TTIs based at least in part on an absence of receiving a negative acknowledgment (NACK) in response to the priority communications.

8. The method of claim 1, further comprising:
transmitting an RTS message during the at least one instance of the plurality of shortened TTIs, the RTS message indicating an identifier and a configuration for the priority communications; and
receiving a CTS message from one or more wireless devices participating in the priority communications, the CTS message indicating a sequence associating the CTS message with the RTS message.

9. The method of claim 1, further comprising:
determining that the priority communications include periodic traffic satisfying a threshold, wherein performing the LBT procedure is based at least in part on the periodic traffic satisfying the threshold.

10. A method for wireless communication, comprising:
receiving, during a listen-before-talk (LBT) procedure, an indication reserving a plurality of shortened transmission time intervals (TTIs) to be used for priority communications to or from a vehicle having a first traffic priority level, the plurality of shortened TTIs each having a duration that is less than that of other TTIs used in other communications to or from the vehicle having a second traffic priority level which is less than the first traffic priority level;
transmitting, during the LBT procedure, an acknowledgement (ACK) message responsive to the indication; and
receiving, during at least one instance of the plurality of shortened TTIs, a request further reserving the at least one instance of the plurality of shortened TTIs for the priority communications based at least in part on the transmitted ACK message, the request being part of a request-to-send/clear-to-send (RTS/CTS) exchange that is performed for only a portion of the plurality of shortened TTIs, wherein shortened TTIs other than the portion are available for other communications having the second traffic priority level.

11. The method of claim 10, wherein receiving the indication further comprises:
receiving the indication on the other TTIs having the second traffic priority level.

12. The method of claim 10, wherein receiving the indication reserving the plurality of shortened TTIs comprises:
identifying a resource tree that comprises a plurality of nodes, each node of the resource tree associated with some or all of a set of available time-frequency resources including the plurality of shortened TTIs; and
selecting the node of the resource tree based at least in part on the plurality of shortened TTIs.

13. The method of claim 10, further comprising:
decoding one or more of a scheduling assignment (SA) message, or a medium access control (MAC) control element (CE), or a radio resource control (RRC) message to identify the indication reserving the plurality of shortened TTIs.

14. The method of claim 10, wherein the request is an RTS, and wherein the method further comprises: sending a CTS message in response to the RTS.

15. The method of claim 10, further comprising:
receiving an RTS message during the at least one instance of the plurality of shortened TTIs, the RTS message indicating an identifier and a configuration for the priority communications; and
transmitting a CTS message for participating in the priority communications, the CTS message indicating a sequence associating the CTS message with the RTS message.

16. A method for wireless communication, comprising:
receiving, during a listen-before-talk (LBT) procedure, an indication reserving a plurality of shortened transmission time intervals (TTIs) to be used for priority communications to or from a vehicle having a first traffic priority level, the plurality of shortened TTIs each having a duration that is less than that of other TTIs used in other communications to or from the vehicle having a second traffic priority level which is less than the first traffic priority level;
determining that a request-to-send (RTS) message is not transmitted during a first symbol in at least one of the shortened TTIs; and
performing an LBT procedure on resources that overlap in time with the at least one shortened TTI to reserve a TTI that includes the overlapping resources and that is longer than the at least one shortened TTI for other communications having the second traffic priority.

17. The method of claim 16, wherein receiving the indication further comprises:
determining, based at least in part on the indication, not to participate in the communications to or from the vehicle having the first traffic priority level; and
refraining from transmitting an acknowledgement message during the LBT procedure.

18. The method of claim 16, wherein receiving the indication further comprises:
receiving the indication on the other TTIs having the second traffic priority level.

19. An apparatus for wireless communication, comprising:
a processor;
memory in electronic communication with the processor; and
instructions stored in the memory and executable by the processor to cause the apparatus to:
identify a plurality of shortened transmission time intervals (TTIs) to be used for priority communications to or from a vehicle having a first traffic priority level, the plurality of shortened TTIs each having a duration that is less than that of other TTIs used in other communications to or from the vehicle having a second traffic priority level which is less than the first traffic priority level;
perform a listen-before-talk (LBT) procedure in order to reserve the plurality of shortened TTIs for the priority communications; and
further reserving via a request-to-send/clear-to-send (RTS/CTS) exchange, at least one instance of the plurality of shortened TTIs for the priority communications, wherein the RTS/CTS exchange is performed for only a portion of the plurality of shortened TTIs, wherein shortened TTIs other than the portion are available for other communications having the second traffic priority level.

20. The apparatus of claim 19, wherein the instructions to further reserve are executable by the processor to cause the apparatus to:
transmit a request to reserve the at least one instance of the plurality of shortened TTIs for the priority communication.

21. The apparatus of claim 19, wherein the instructions to perform the LBT procedure further are executable by the processor to cause the apparatus to:
perform the LBT procedure using the other TTIs having the second traffic priority level.

22. The apparatus of claim 19, wherein the instructions are further executable by the processor to cause the apparatus to:
receive, during the LBT procedure, an acknowledgement (ACK) message from one or more UEs to participate in the priority communications; and
perform the priority communications with the UEs from which ACK messages were received.

23. The apparatus of claim 19, wherein the instructions to perform the LBT procedure are executable by the processor to cause the apparatus to:
identify a resource tree that comprises a plurality of nodes, each node of the resource tree associated with some or all of a set of available time-frequency resources that include the plurality of shortened TTIs; and
select the node of the resource tree based at least in part on the plurality of shortened TTIs.

24. The apparatus of claim 19, wherein the instructions are further executable by the processor to cause the apparatus to:
configure one or more of a scheduling assignment (SA) message, or a medium access control (MAC) control element (CE), or a radio resource control (RRC) message to provide an indication in the LBT procedure reserving the plurality of shortened TTIs.

25. The apparatus of claim 19, wherein the instructions are further executable by the processor to cause the apparatus to:
perform the RTS/CTS exchange for only the portion of the plurality of shortened TTIs based at least in part on an absence of receiving a negative acknowledgment (NACK) in response to the priority communications.

26. The apparatus of claim 19, wherein the instructions are further executable by the processor to cause the apparatus to:
transmit an RTS message during the at least one instance of the plurality of shortened TTIs, the RTS message indicating an identifier and a configuration for the priority communications; and
receive a CTS message from one or more wireless devices participating in the priority communications, the CTS message indicating a sequence associating the CTS message with the RTS message.

* * * * *